(12) United States Patent
Kozuki et al.

(10) Patent No.: US 10,481,248 B2
(45) Date of Patent: Nov. 19, 2019

(54) DETECTION APPARATUS, UNDERWATER DETECTION APPARATUS AND RADAR APPARATUS

(71) Applicant: FURUNO ELECTRIC CO., LTD., Nishinomiya (JP)

(72) Inventors: Kohei Kozuki, Nishinomiya (JP); Kohei Iwata, Neyagawa (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 374 days.

(21) Appl. No.: 15/371,051

(22) Filed: Dec. 6, 2016

(65) Prior Publication Data

US 2017/0168153 A1    Jun. 15, 2017

(30) Foreign Application Priority Data

Dec. 11, 2015  (JP) ................. 2015-241993

(51) Int. Cl.
| | |
|---|---|
| *G01S 13/34* | (2006.01) |
| *G01S 15/42* | (2006.01) |
| *G01S 15/96* | (2006.01) |
| *G01S 15/34* | (2006.01) |

(52) U.S. Cl.
CPC .......... *G01S 13/341* (2013.01); *G01S 13/343* (2013.01); *G01S 15/34* (2013.01); *G01S 15/42* (2013.01); *G01S 15/96* (2013.01)

(58) Field of Classification Search
CPC ...... G01S 13/341; G01S 13/34; G01S 13/343; G01S 13/347; G01S 15/34; G01S 15/42; G01S 15/96
See application file for complete search history.

(56) References Cited

U.S. PATENT DOCUMENTS

| | | | | | |
|---|---|---|---|---|---|
| 5,369,409 | A | * | 11/1994 | Urabe ................. | G01S 7/023 342/128 |
| 5,751,241 | A | * | 5/1998 | Lewiner ............. | G01S 13/34 342/104 |
| 6,121,918 | A | * | 9/2000 | Tullsson ............. | G01S 7/023 342/128 |
| 7,149,148 | B2 | | 12/2006 | Berkman et al. | |
| 2004/0264297 | A1 | * | 12/2004 | Berkman ............ | G01S 7/534 367/99 |

(Continued)

FOREIGN PATENT DOCUMENTS

EP        0 199 571 A1    10/1986

*Primary Examiner* — Bernarr E Gregory
*Assistant Examiner* — Daniel P Malley, Sr.
(74) *Attorney, Agent, or Firm* — Knobbe, Martens, Olson & Bear, LLP

(57) ABSTRACT

A Continuous Transmission Frequency Modulated (CTFM) detection apparatus is provided. The apparatus includes a projector, a sensor, and a hardware processor. The projector is configured to transmit a frequency modulated transmission wave at a given transmission period. The sensor is configured to receive a reflected wave, the reflected wave comprising a reflection of the transmission wave on a target object. The hardware processor is programmed to at least generate a beat signal based at least in part on the transmission wave and the reflected wave, extract asynchronously from the transmission period a processing signal from the beat signal, and generate information related to the target object based on the processing signal.

16 Claims, 25 Drawing Sheets

(56) References Cited

U.S. PATENT DOCUMENTS

| | | | |
|---|---|---|---|
| 2011/0234448 A1* | 9/2011 | Hayase | G01S 13/18 342/70 |
| 2012/0280854 A1* | 11/2012 | Corbett | G01S 7/023 342/159 |
| 2013/0083869 A1* | 4/2013 | de Ruijter | H04L 27/22 375/324 |
| 2013/0128699 A1* | 5/2013 | Schmid | G01S 15/42 367/99 |
| 2015/0378008 A1* | 12/2015 | Ookawa | G01S 13/34 342/194 |

* cited by examiner

COMPARATIVE EXAMPLE

DETECTION APPARATUS, UNDERWATER DETECTION APPARATUS AND RADAR APPARATUS

CROSS-REFERENCE TO RELATED APPLICATION(S)

This application claims priority under 35 U.S.C. § 119 to Japanese Patent Application No. 2015-241993, which was filed on Dec. 11, 2015, the entire disclosure of which is hereby incorporated by reference.

TECHNICAL FIELD

The present disclosure relates to a detection apparatus, an underwater detection apparatus, and a radar apparatus, which detect the position of a target object.

BACKGROUND

U.S. Pat. No. 7,149,148B2 and EP0199571A1 disclose detection apparatuses which process an echo signal by using a dual demodulation or dual sweep demodulation. The dual demodulation is one type of demodulating methods in which two systems of local signals having frequencies different from a transmission signal are prepared, the two local signals are each multiplied by a reception signal and the results of the two multiplications are added to generate a beat signal. A detection of a target object is performed based on the beat signal generated by the dual demodulation.

The present inventors found out a problem that side lobes (so-called range side lobes) of a peak waveform of a target object become large when the dual demodulation described above is applied to the detection apparatuses. If such range side lobes are generated, the target object to be detected is buried in the range side lobes. Therefore, it is impossible to detect the target object.

SUMMARY

The present disclosure is made in view of the problem described above, and the purpose thereof is to provide a detection apparatus capable of preventing an omission in detection of a target object.

(1) According to one aspect of this disclosure, a Continuous Transmission Frequency Modulated (CTFM) detection apparatus is provided. The apparatus includes a projector, a sensor, and a hardware processor. The projector is configured to transmit a frequency modulated transmission wave at a given transmission period. The sensor is configured to receive a reflected wave, the reflected wave comprising a reflection of the transmission wave on a target object. The hardware processor is programmed to at least generate a beat signal based at least in part on the transmission wave and the reflected wave, extract asynchronously from the transmission period a processing signal from the beat signal, and generate information related to the target object based on the processing signal.

(2) The hardware processor may further be programmed to at least extract a plurality of extracted beat signals from the beat signal, each extracted beat signal from the plurality of extracted beat signals being extracted from a gate interval set on the beat signal, and select the processing signal from the plurality of extracted beat signals.

(3) The hardware processor may further be programmed to at least calculate an absolute value of a complex data corresponding to each extracted beat signal, each complex data being obtained from a frequency conversion of the extracted beat signal, and select the processing signal from the plurality of extracted beat signals, the selected extracted beat signal corresponding to the complex data with the smallest absolute value.

(4) The sensor may include a plurality of receiving elements. The hardware processor may further be programmed to at least generate a plurality of beat signals, each beat signal corresponding to a receiving element from the plurality of receiving elements, based at least in part on the transmission wave and the reflected wave received by the receiving element, generate a representative beat signal based at least in part on the transmission wave and a representative signal, the representative signal being generated from at least one of the reflected waves received by the plurality of receiving elements, extract a plurality of extracted representative beat signals from the representative beat signal, each extracted representative beat signal from the plurality of extracted representative beat signals being extracted from a gate interval set on the representative beat signal, calculate an absolute value of a complex data corresponding to each extracted representative beat signal, each complex data being obtained from a frequency conversion of the extracted representative beat signal, and select the processing signal from the plurality of extracted beat signals, the selected extracted beat signal corresponding to the complex data with the smallest absolute value.

(5) At least two gate intervals from the plurality of gate intervals may overlap a portion of each other in the time domain.

(6) The hardware processor may further be programmed to at least detect a beat signal phase jump timing at which a phase change of the beat signal is above a given value, set a gate interval on the beat signal to extract an extracted beat signal, a center time of the gate interval being shifted from the beat signal phase jump timing, and generate the processing signal based on the extracted beat signal.

(7) The hardware processor may further be programmed to at least detect the beat signal phase jump timing by calculating phase change of the beat signal.

(8) The hardware processor may further be programmed to at least detect the beat signal phase jump timing by calculating frequency change of a signal generated from the reflected wave.

(9) The hardware processor may further be programmed to at least detect the beat signal phase jump timing based on a position of a given target object relative to the CTFM detection apparatus.

(10) The sensor may include a plurality of receiving elements. The hardware processor may further be programmed to at least generate a plurality of beat signals, each beat signal corresponding to a receiving element from the plurality of receiving elements based at least in part on the transmission wave and the reflected wave received by the receiving element, detect the beat signal phase jump timing from a representative signal generated from at least one of the reflected waves received by the plurality of receiving elements, and extract the extracted beat signal from the gate interval set on each of the beat signals and generate the processing signal corresponding to each extracted beat signal.

(11) The hardware processor may further be programmed to at least estimate a direction of the target object using beamforming processing.

(12) The hardware processor may further be programmed to at least multiply the extracted beat signal by a window function, and generate the processing signal based on the extracted beat signal multiplied by the window function.

(13) According to another aspect of this disclosure, an underwater detection apparatus is provided. The underwater detection apparatus includes the CTFM detection apparatus described above.

(14) According to another aspect of this disclosure, a radar apparatus is provided. The radar apparatus includes the CTFM detection apparatus described above.

According to the present disclosure, the detection apparatus which prevents the omission in detection of the target object is provided.

BRIEF DESCRIPTION OF DRAWINGS

The present disclosure is illustrated by way of example and not by way of limitation in the figures of the accompanying drawings, in which like reference numerals indicate like elements and in which.

DETAILED DESCRIPTION

Hereinafter, one embodiment of an underwater detection apparatus according to the present disclosure will be described with reference to the accompanying drawings. An underwater detection apparatus 1 according to this embodiment is a Continuous Transmission Frequency Modulated (CTFM) detection apparatus, which is mounted, for example, to the bottom of a hull of a ship (e.g., a fishing boat in this embodiment), and is mainly used for detection of a target object, such as fish and a school of fish. Note that the term "ship" as used herein refers to any type of ships, boats, watercrafts, or vessels, regardless of size or number of people on board, or submarines, aircraft, or spacecrafts, if they are applicable, regardless of seawater, freshwater, brackish water, air, space, or gas where the ship is used for this purpose. In addition, if it is described as "the ship" herein, the ship means any type of the ship concerned to which the detection apparatus is mounted for the purpose of this disclosure. The underwater detection apparatus 1 processes echo signals using dual frequency demodulation (dual demodulation or dual sweep demodulation). Thus, it eliminates the problem that a beat signal cannot be extracted within a period of time from a transmission of an ultrasonic wave to a return of a corresponding echo (a so-called blind interval) to accordingly acquire a high-precision echo image.

Entire Configuration

Figure 1:
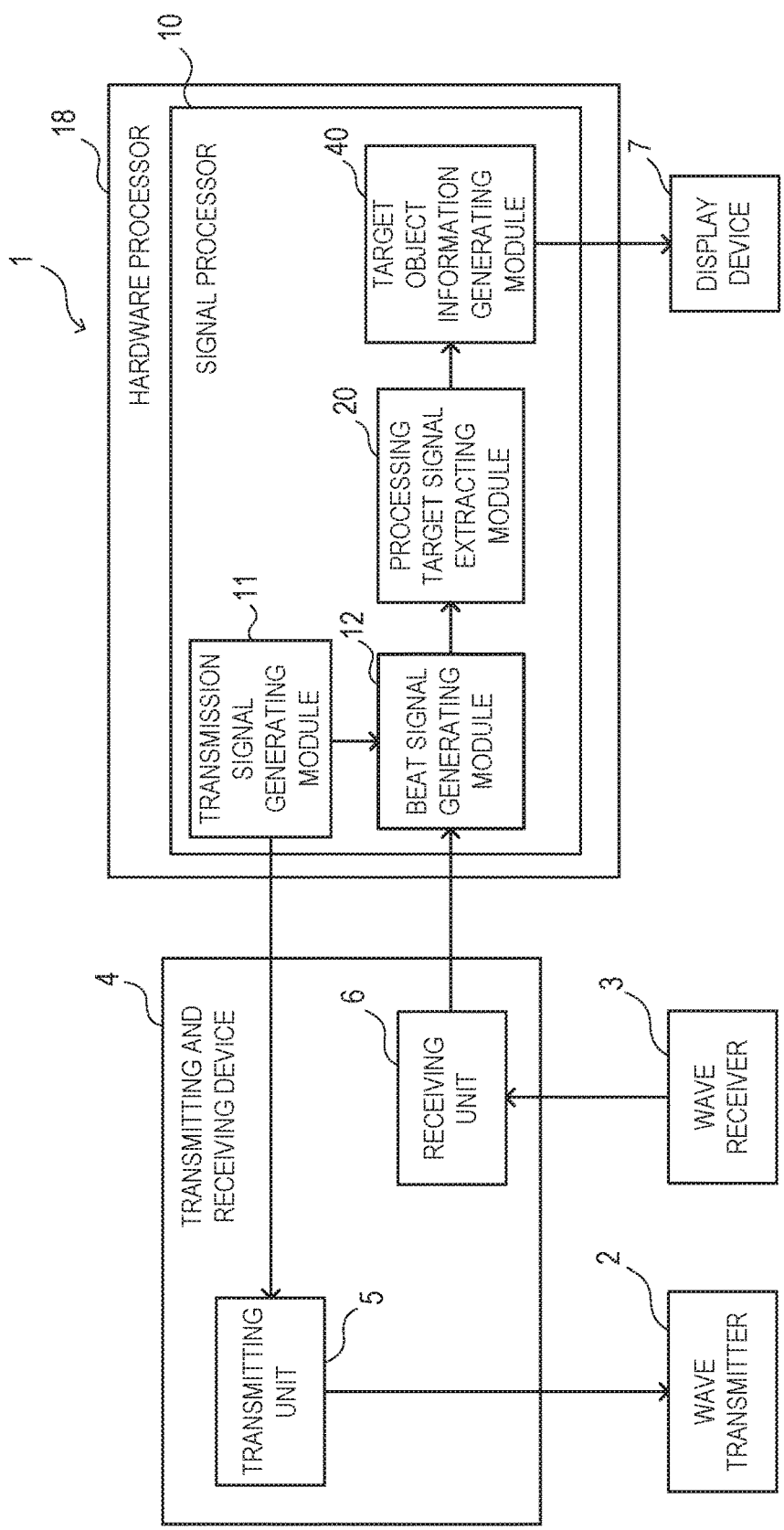
FIG. 1 is a block diagram illustrating a configuration of an underwater detection apparatus according to one embodiment of the present disclosure.

FIG. 1 is a block diagram illustrating a configuration of the underwater detection apparatus 1 according to this embodiment. As illustrated in FIG. 1, the underwater detection apparatus 1 includes a wave transmitter 2 (which may also be referred to as a projector), a wave receiver 3 (which may also be referred to as a sensor), a wave transmitting/receiving device 4, a signal processor 10 (which may also be referred to as a hardware processor), and a display device 7.

The wave transmitter 2 transmits underwater an ultrasonic wave as a transmission wave, and is fixed to the ship bottom so that a transmitting surface (not illustrated) of the wave transmitter 2 is exposed underwater and the ultrasonic wave transmitted from the transmitting surface travels directly below.

Figure 2:
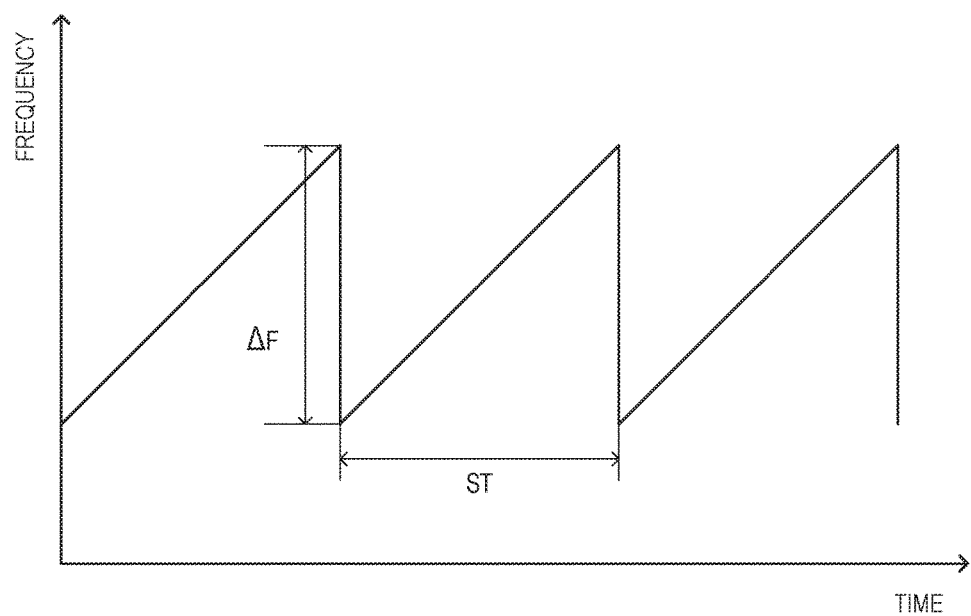
FIG. 2 is a graph illustrating a frequency change with time of an ultrasonic wave transmitted from a wave transmitter.

The ultrasonic wave transmitted from the wave transmitter 2 is a frequency-swept ultrasonic wave (which may also be referred to as a frequency modulated transmission wave). For example, the wave transmitter 2 repeatedly transmits a chirp at every given period of time (which may also be referred to as a given transmission period), the chirp gradually changing frequency with time. FIG. 2 is a graph illustrating the frequency change with time of the ultrasonic wave transmitted from the wave transmitter 2. Reference character "ST" in FIG. 2 indicates a sweep time, and "ΔF" indicates a sweep bandwidth.

The wave receiver 3 is fixed to the ship bottom so that a receiving surface (not illustrated) by which the ultrasonic wave is received is exposed underwater. The wave receiver 3 receives a reflected wave (echo) of the ultrasonic wave as a reception wave, and converts the reception wave into an electrical signal as a reception signal.

The wave transmitting/receiving device 4 includes a transmitting unit 5 and a receiving unit 6.

The transmitting unit 5 amplifies a transmission signal generated by the signal processor 10, and applies the amplified, high-voltage transmission signal to the wave transmitter 2.

The receiving unit 6 amplifies the electrical signal as the reception signal outputted from the wave receiver 3, and carries out an A/D conversion of the amplified reception signal. The receiving unit 6 then outputs the reception signal converted into a digital signal to the signal processor 10.

The signal processor 10 includes a transmission signal generating module 11, a beat signal generating module 12, a processing target signal extracting module 20, and a target object information generating module 40. The signal processor 10 is, for example, implemented on devices, such as a hardware processor 18 (e.g., CPU, FPGA, etc.) and nonvolatile memory. For example, if the CPU reads one or more computer executable programs from the nonvolatile memory and runs them, the signal processor 10 comprehensively functions as the transmission signal generating module 11, the beat signal generating module 12, the processing target signal extracting module 20, and the target object information generating module 40. The signal processor 10 performs processing which generates the transmission signal, and processing which processes the reception signal outputted from the receiving unit 6 and generates an image signal of a target object. Configuration and operation of each component which constitutes the signal processor 10 will be described later in detail.

Figure 3:
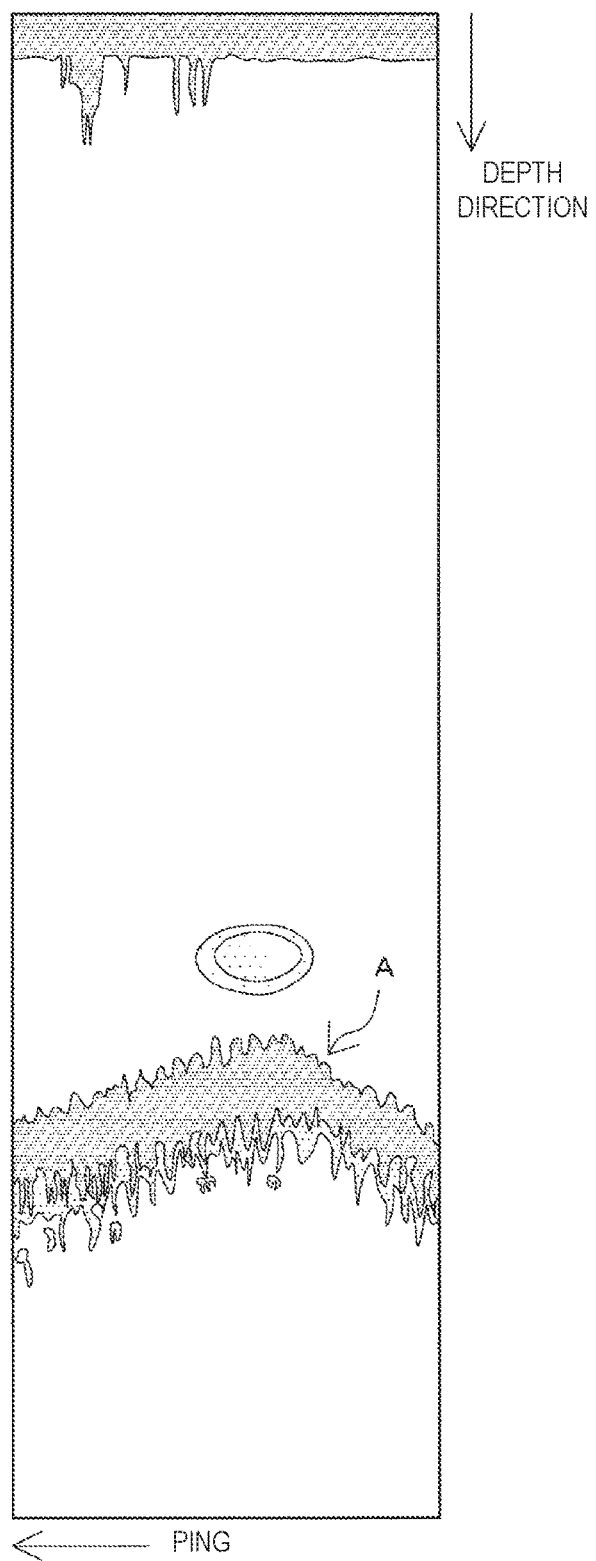
FIG. 3 is a view illustrating one example of an echo image displayed on a display device.

FIG. 3 is a view illustrating one example of an echo image displayed on the display device 7. The display device 7 displays on a display screen the echo image according to the image signals outputted from the signal processor 10. In this embodiment, the display device 7 displays an underwater state under the ship. For example, as illustrated in FIG. 3, the display device 7 displays a two-dimensional screen image where a downward vertical axis corresponds to a depth direction, and a leftward horizontal axis is comprised of pings. Each ping corresponds to a period of one sweep time ST or shorter of the chirp which is transmitted at a certain timing (e.g., a gate interval, described later). In this echo image, one vertical linear image obtained from the latest image signal is indicated as one vertical line on the rightmost side of the screen image, and a previous image scrolls leftward per ping each time the next new image signal is acquired. By a user looking at the display screen, he/she can appropriately understand the underwater state under the ship, such as the existence and the position of single fish and schools of fish, a seabed texture, and structures such as artificial fish reefs.

In addition, the display device 7 displays intensities of echoes for each depth position below the ship by color tones according to the echo intensities. For example, in the display device 7, screen positions are normally colored according to the echo intensity, where the highest echo intensity is indicated in red, the lowest echo intensity is indicated in blue, and intermediate echo intensities are indicated in orange, yellow and green, from higher to lower echo intensities. However, for sake of illustration in FIG. 3, the echo intensity corresponds to the density of dot hatching. In FIG. 3, an echo image A of the seabed is also displayed on the display device 7, and an echo image of a school of fish is also displayed above the seabed echo image A. According to the underwater detection apparatus 1 according to this embodiment, the seabed echo image A is particularly obtained vividly or clearly, although the reason for this will be described later in detail. Thus, for example, fish located near the seabed can also be detected easily.

Configuration of Signal Processor

Figure 4:
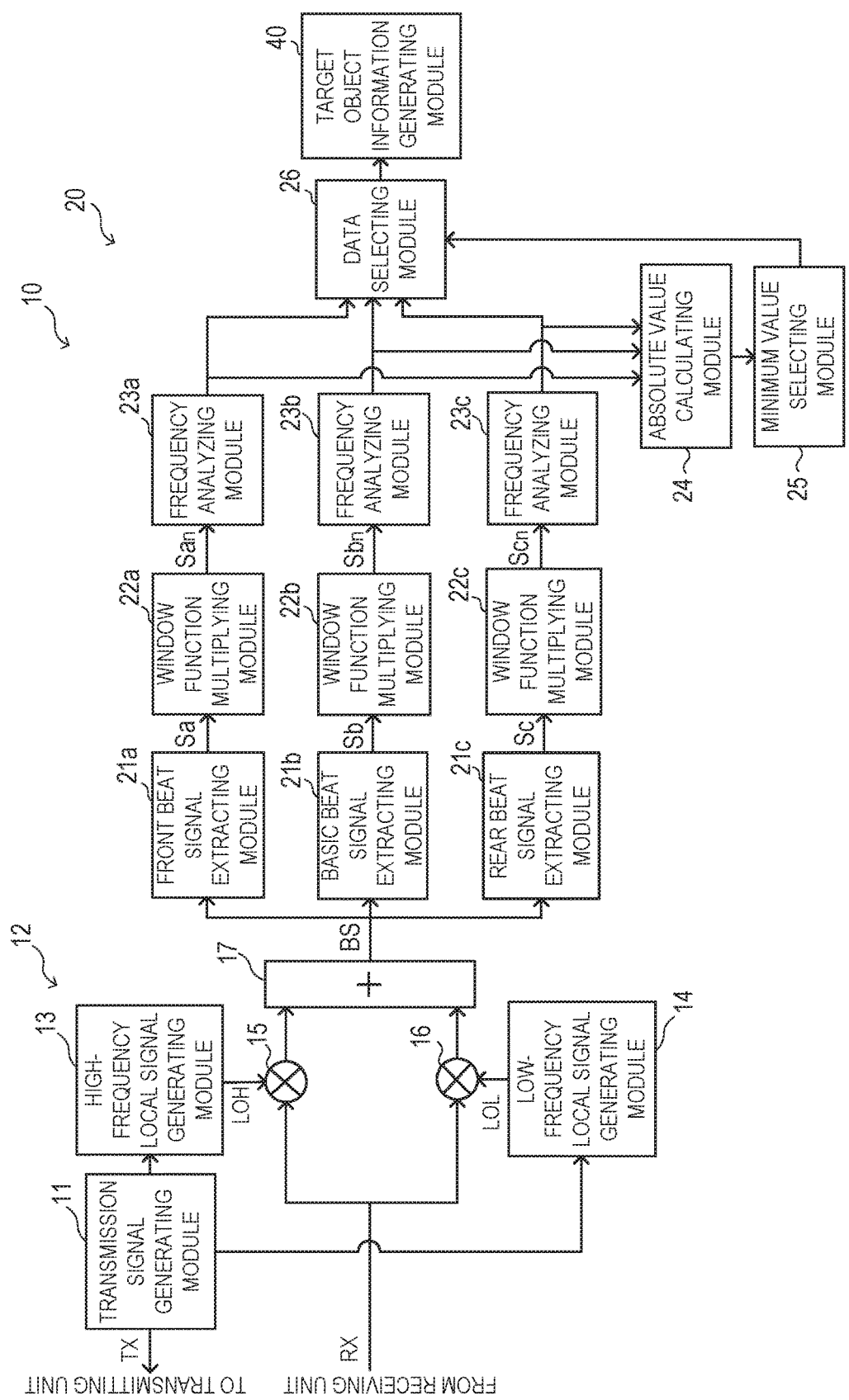
FIG. 4 is a block diagram illustrating a configuration of a signal processor illustrated in FIG. 1.

FIG. 4 is a block diagram illustrating a configuration of the signal processor 10. Referring to FIGS. 1 and 4, the signal processor 10 includes the transmission signal generating module 11, the beat signal generating module 12, the processing target signal extracting module 20, and the target object information generating module 40, as described above.

The transmission signal generating module 11 generates the electrical signal as the transmission signal which is a basis of the transmission wave transmitted from the wave transmitter 2. A transmission signal TX generated by the transmission signal generating module 11 is transmitted to the transmitting unit 5 and the beat signal generating module 12.

Configuration of Beat Signal Generating Module

The beat signal generating module 12 generates a beat signal BS of which the frequency is to be analyzed. As illustrated in FIG. 4, the beat signal generating module 12 includes a high-frequency local signal generating module 13, a low-frequency local signal generating module 14, a first multiplying module 15, a second multiplying module 16, and an adding module 17.

Figure 5:
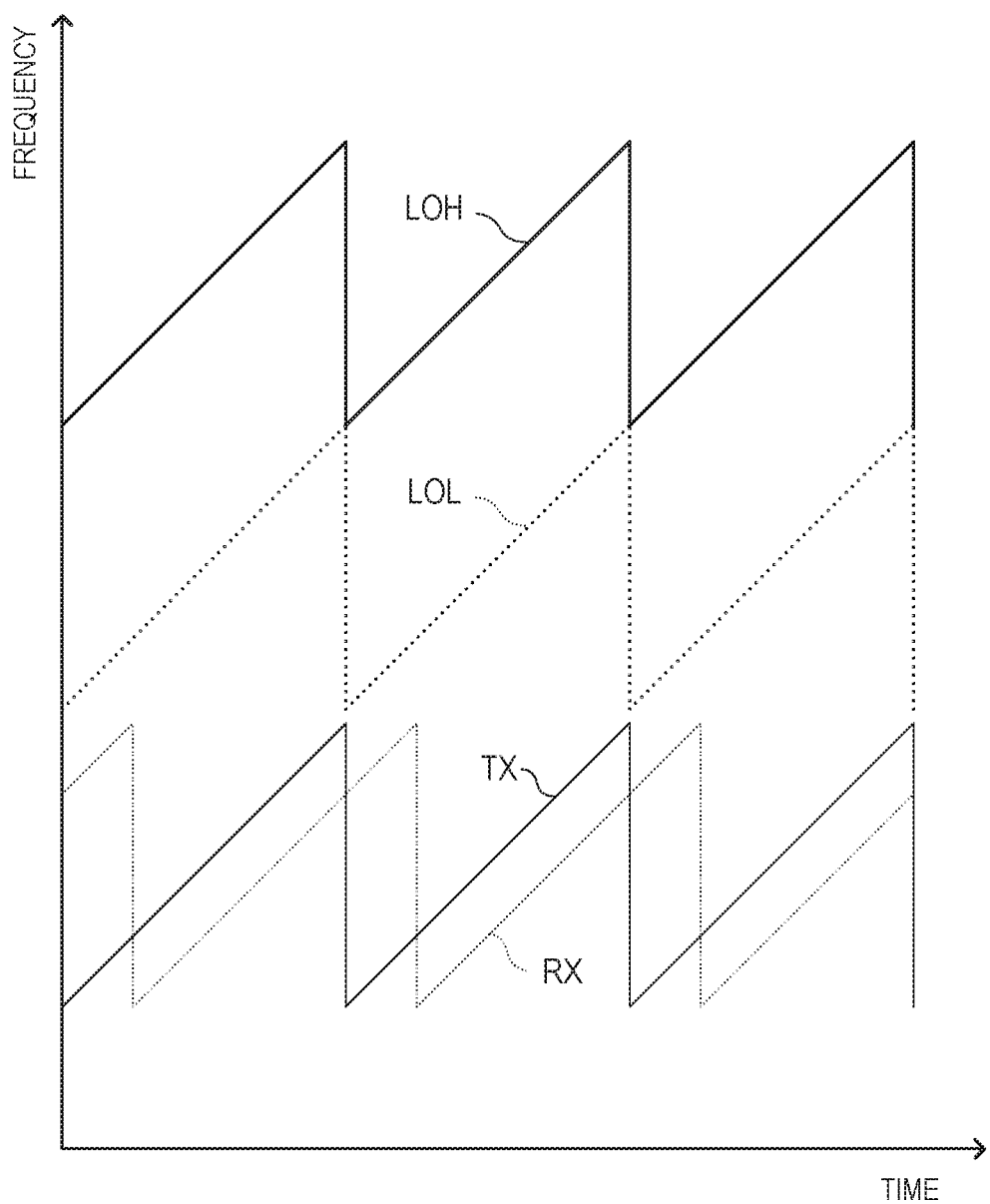
FIG. 5 is a graph illustrating frequency changes with time of a transmission signal, a reception signal, a high-frequency local signal, and a low-frequency local signal.

FIG. 5 is a graph illustrating frequency changes with time of the transmission signal TX, a reception signal RX, a high-frequency local signal LOH, and a low-frequency local signal LOL.

The high-frequency local signal generating module 13 generates the high-frequency local signal LOH based on the transmission signal TX generated by the transmission signal generating module 11. As illustrated in FIG. 5, the high-frequency local signal LOH is a signal in which a chirp of which the frequency changes gradually with time is repeated at the same period as the transmission signal. The frequency of the high-frequency local signal LOH is set higher than the frequency of the transmission signal TX. A sweep time and a sweep bandwidth of the high-frequency local signal LOH are the same as a sweep time and a sweep bandwidth of the transmission signal TX.

The low-frequency local signal generating module 14 generates the low-frequency local signal LOL based on the transmission signal TX generated by the transmission signal generating module 11. As illustrated in FIG. 5, the low-frequency local signal LOL is a signal in which a chirp of which the frequency changes gradually with time is repeated at the same period as the transmission signal, similar to the high-frequency local signal LOH. The frequency of the low-frequency local signal LOL is set higher than the frequency of the transmission signal TX and is lower than the frequency of the high-frequency local signal LOH. A sweep time and a sweep bandwidth of the low-frequency local signal LOL are the same as the sweep times and the sweep bandwidths of the transmission signal TX and the high-frequency local signal LOH.

Figure 6A:
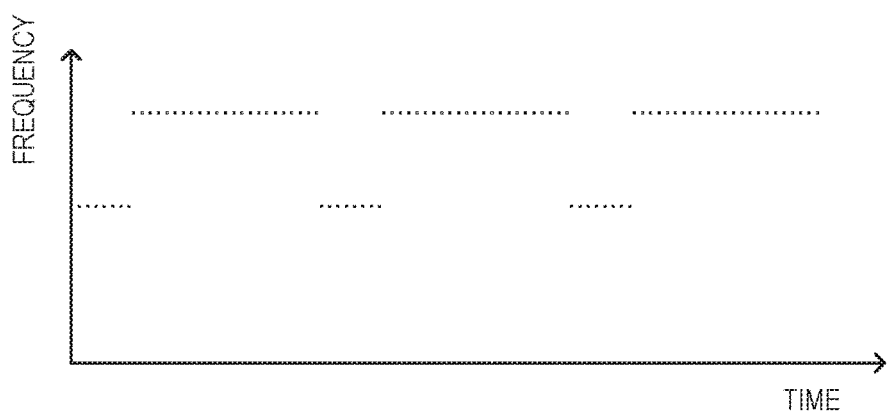
FIG. 6A is a graph illustrating a frequency change with time of a signal outputted from a first multiplying module.

The first multiplying module 15 mixes or multiplies the high-frequency local signal LOH which is generated by the high-frequency local signal generating module 13 with/by the reception signal RX. The first multiplying module 15 extracts a signal having a difference between the frequency of the high-frequency local signal LOH and the frequency of the reception signal RX as a frequency component from the mixing result, and outputs the extracted signal to the adding module 17. FIG. 6A is a graph illustrating the frequency change with time of the signal acquired from mixing by the first multiplying module 15.

Figure 6B:
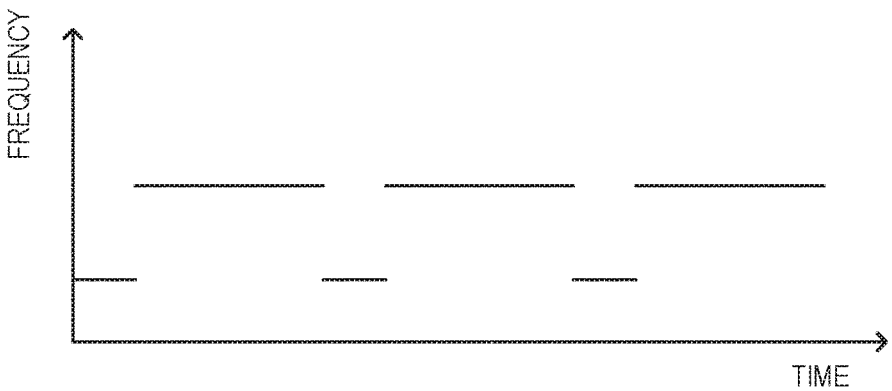
FIG. 6B is a graph illustrating a frequency change with time of a signal outputted from a second multiplying module.

The second multiplying module 16 mixes or multiplies the low-frequency local signal LOL which is generated by the low-frequency local signal generating module 14 with/by the reception signal RX. The second multiplying module 16 extracts a signal having a difference between the frequency of the low-frequency local signal LOL and the frequency of the reception signal RX as a frequency component from the mixing result, and outputs the extracted signal to the adding module 17. FIG. 6B is a graph illustrating a frequency change with time of the signal acquired from mixing by the second multiplying module 16.

Figure 6C:
FIG. 6C is a graph illustrating a frequency change with time of a signal outputted from an adding module.

The adding module 17 adds the signal outputted from the first multiplying module 15 to the signal outputted from the second multiplying module 16. The adding module 17 outputs the added result as the beat signal BS to the processing target signal extracting module 20. FIG. 6C illustrates a graph illustrating a frequency change with time of the beat signal BS which is a signal outputted from the adding module 17.

Configuration of Processing Target Signal Extracting Module

The processing target signal extracting module 20 extracts a processing target signal which is a signal to be processed by the target object information generating module 40 from the beat signal BS outputted from the adding module 17. Referring to FIG. 4, the processing target signal extracting module 20 includes three beat signal extracting modules 21a, 21b and 21c, three window function multiplying modules 22a, 22b and 22c, three frequency analyzing modules 23a, 23b and 23c, an absolute value calculating module 24, a minimum value selecting module 25, and a data selecting module 26 as a processing target signal selecting module.

Figure 7:
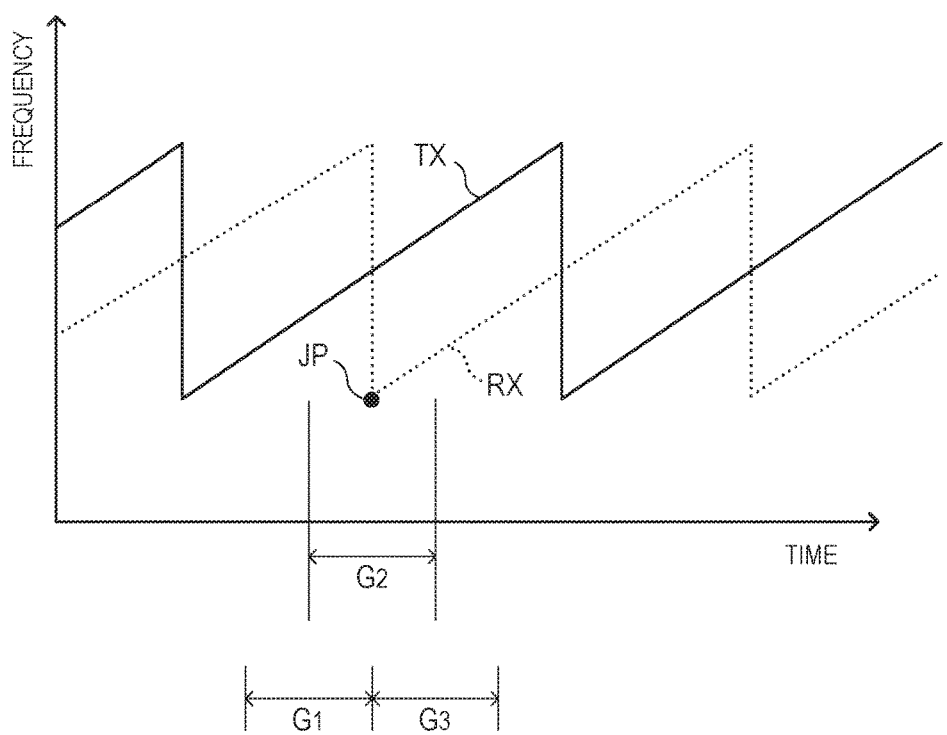
FIG. 7 is a view illustrating gate intervals, where the gate intervals are illustrated with a graph illustrating frequency changes with time of a transmission wave and a reception wave.

FIG. 7 is a view illustrating gate intervals $G_1$-$G_3$, where the gate intervals $G_1$-$G_3$ are illustrated with a graph illustrating frequency changes with time of the transmission signal TX and the reception signal RX.

The three beat signal extracting modules 21a, 21b and 21c are comprised of a front beat signal extracting module 21a, a basic beat signal extracting module 21b, and a rear beat signal extracting module 21c. The three beat signal extracting modules 21a, 21b and 21c extract portions of the beat signal BS contained in gate intervals $G_1$-$G_3$ (specifically, a front gate interval $G_1$, a basic gate interval $G_2$, a rear gate interval $G_3$). Still referring to FIG. 7, the gate intervals $G_1$-$G_3$ are designed to have the same gate width. The front gate interval $G_1$ is located forward from the basic gate interval $G_2$. Specifically, the front gate interval $G_1$ is set so that an extraction start time point thereof is earlier than that of the basic gate interval $G_2$. The rear gate interval $G_3$ is located rearward from the basic gate interval $G_2$. Specifically, the rear gate interval $G_3$ is set so that an extraction start time point thereof is later than that of the basic gate interval $G_2$. More specifically, the front gate interval $G_1$ overlaps with the front half of the basic gate interval $G_2$, and the rear gate interval $G_3$ overlaps with the rear half of the basic gate interval $G_2$. Note that, although illustration is omitted in FIG. 7, the basic gate interval $G_2$ synchronizes with a transmitting cycle (which may also be referred to as a transmission period) of the transmission wave.

The front beat signal extracting module 21a extracts a signal included in the front gate interval $G_1$ as a front signal Sa from the beat signal BS. The basic beat signal extracting module 21b extracts a signal included in the basic gate interval $G_2$ as a basic signal Sb from the beat signal BS. The rear beat signal extracting module 21c extracts a signal included in the rear gate interval $G_3$ as a rear signal Sc from the beat signal BS. If transiting to processing for the next ping, the basic gate interval $G_2$ is shifted to later side (retarded) by one gate width, and a beat signal included in this section is extracted to be used as the basic signal Sb. The front signal Sa and the basic signal Sb are similarly processed as described above. Thus, the front signal Sa, the basic signal Sb, and the rear signal Sc are extracted as an extracted beat signal.

The window function multiplying modules 22a, 22b and 22c are provided corresponding to the beat signal extracting modules 21a, 21b and 21c, respectively. A plurality of window functions (in this embodiment, N window functions) are stored in each of the window function multiplying modules 22a, 22b and 22c. As the plurality of window functions, a plurality of gauss windows which have different $\sigma$ values are used, for example. The window function multiplying module 22a multiplies the front signal Sa included in the front gate interval $G_1$ by the N window functions to calculate N window processed front signals $Sa_n$ (n=1, 2, ..., N). The window function multiplying module 22b multiplies the basic signal Sb included in the basic gate interval $G_2$ by the N window functions to calculate N window processed basic signals $Sb_n$ (n=1, 2, ..., N). The window function multiplying module 22c multiplies the rear signal Sc included in the rear gate interval $G_3$ by the N window functions to calculate N window processed rear signals $Sc_n$ (n=1, 2, ..., N).

The frequency analyzing modules 23a, 23b and 23c are provided corresponding to the window function multiplying modules 22a, 22b and 22c, respectively. The frequency analyzing modules 23a, 23b and 23c conduct a frequency analysis of the N window processed signals $Sa_n$, $Sb_n$ and $Sc_n$ outputted from the window function multiplying modules 22a, 22b and 22c, respectively, to generate data indicative of an amplitude and a phase for each window processed signal.

Note that each data is an amplitude spectrum and a phase spectrum and, thus, the data may also be collectively referred to as a complex spectrum. The frequency analyzing module 23a calculates the complex spectrum for each of the N window processed front signals $Sa_n$, the frequency analyzing module 23b calculates a complex spectrum for each of the N window processed basic signals $Sb_n$, and the frequency analyzing module 23c calculates a complex spectrum for each of the N window processed rear signals $Sc_n$. That is, the three frequency analyzing modules 23a, 23b and 23c obtain the 3×N complex spectrums. The 3×N complex spectrums (i.e., the complex data) are assigned with mutually different indexes (e.g., numbers), respectively. Note that the frequency analyzing method implemented by the frequency analyzing modules 23a, 23b and 23c may include a discrete Fourier transform (DFT), and a Fast Fourier Transform (FFT).

The absolute value calculating module 24 calculates an absolute value of the complex value at each point of 3×N complex spectrums. For example, the absolute value calculating module 24 calculates the absolute value of each complex data by taking a square root of a value which is obtained by adding the square of the real part of each complex data to the square of the imaginary part. Thus, the absolute value calculating module 24 calculates 3×N absolute values for each depth position.

The minimum value selecting module 25 selects the smallest absolute value from the 3×N absolute values for each depth position calculated by the absolute value calculating module 24, and outputs the number assigned to the complex data from which the smallest absolute value has been calculated to the data selecting module 26 as a selected number at each depth position.

The data selecting module 26 outputs the complex data with the assigned number corresponding to the selected number outputted from the minimum value selecting module 25 to the target object information generating module 40 as a processing target signal (which may also be referred to as a processing signal). The data selecting module 26 sequentially outputs the processing target signal selected for each depth position to the target object information generating module 40 as IQ echo data. That is, the data selecting module 26 selects the signal based on one of the front signal Sa, the basic signal Sb and the rear signal Sc, for each depth position. As a result, the processing target signal extracting module 20 extracts the processing target signal asynchronously from the transmitting cycle of the transmission wave.

Note that, although illustration is omitted, band limit processing modules are provided both upstream and downstream of each of the frequency analyzing modules 23a, 23b and 23c of the processing target signal extracting module 20. Thus, unnecessary components contained in the reception signal are removed.

The target object information generating module 40 generates information on target objects (e.g., a seabed, fish, etc.) based on the IQ echo data outputted from the processing target signal extracting module 20. Specifically, the target object information generating module 40 performs an echo amplitude calculation from the IQ echo data, a logarithmic conversion, and performs a color conversion of the logarithmically-converted signal according to a signal level to generate an image signal. In this embodiment, the target object information generating module 40 generates an underwater image signal. The image signal generated by the target object information generating module 40 is outputted to the display device 7 as described above to display an echo image according to the image signal on the display device 7, as illustrated in FIG. 3.

Problems of Conventional Arts

Figure 8:
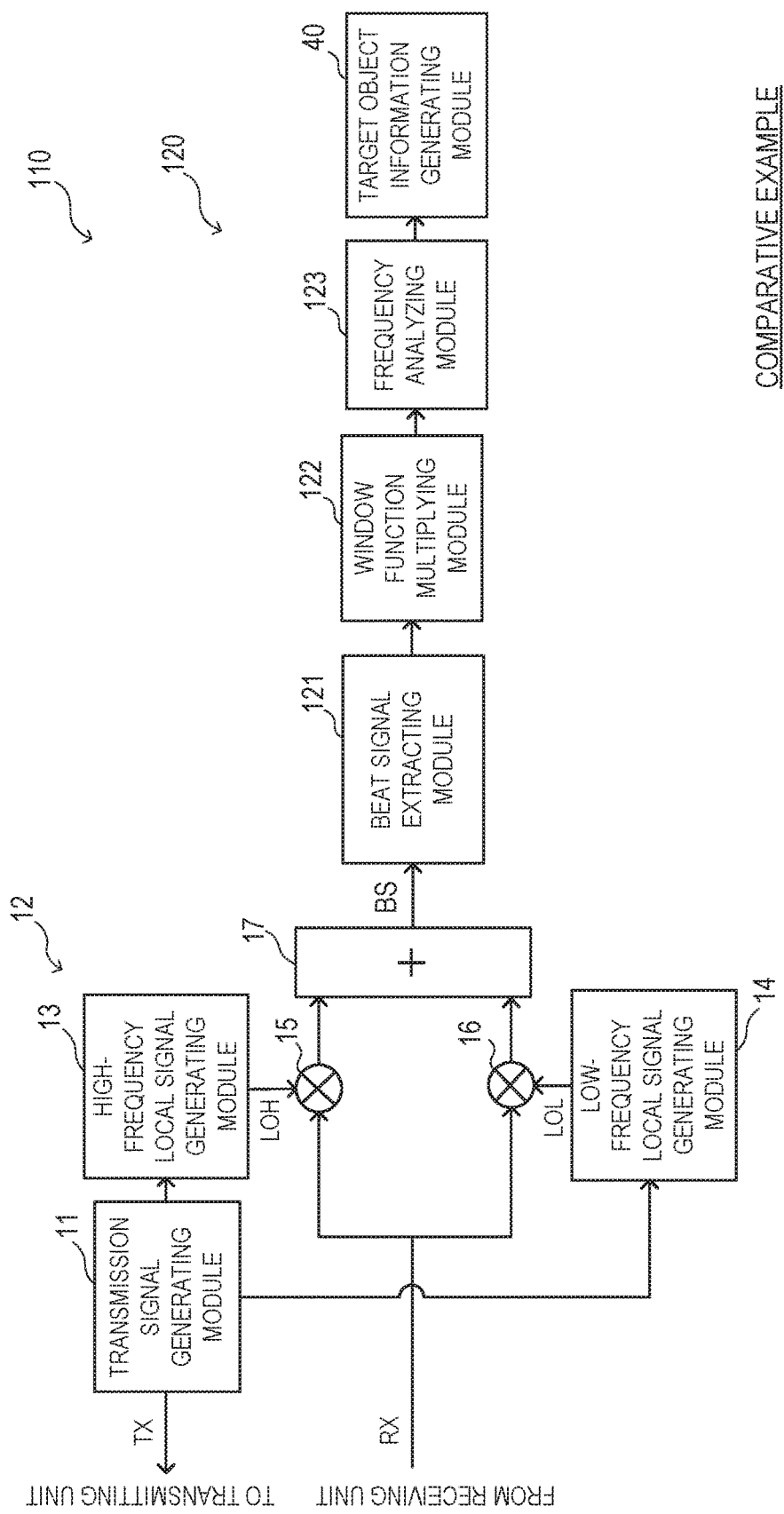
FIG. 8 is a block diagram illustrating a configuration of a signal processor of an underwater detection apparatus according to one comparative example, corresponding to FIG. 4.
Figure 9:
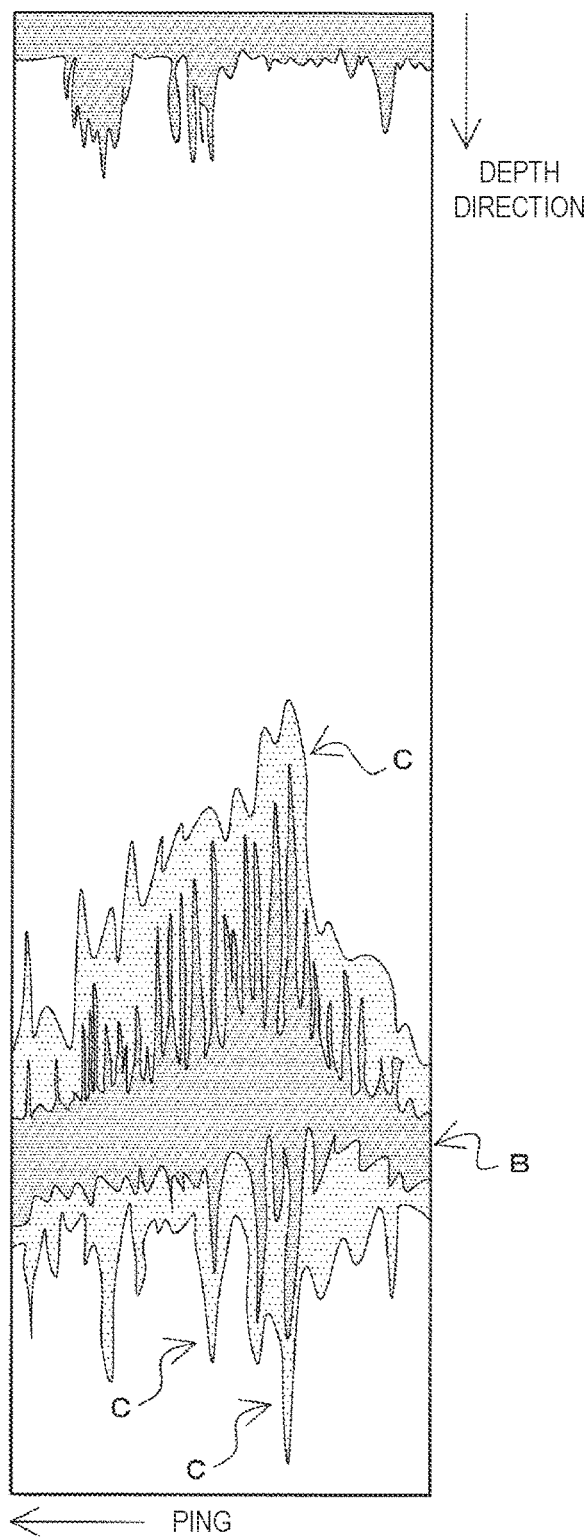
FIG. 9 is a view illustrating one example of an echo image displayed on a display device of the underwater detection apparatus according to the comparative example, corresponding to FIG. 3.

FIG. 8 is a block diagram illustrating a configuration of a signal processor 110 of an underwater detection apparatus according to one comparative example, corresponding to FIG. 4, and FIG. 9 is a view illustrating one example of an echo image displayed on a display device of the underwater detection apparatus according to the comparative example, corresponding to FIG. 3.

The signal processor 110 of the underwater detection apparatus according to this comparative example is provided to a conventionally-known underwater detection apparatus, and the followings are different from the signal processor 10 of the underwater detection apparatus 1 according to the embodiment. Specifically, the signal processor 110 includes one beat signal extracting module 121 instead of the three beat signal extracting modules 21a, 21b and 21c, one window function multiplying module 122 instead of the three window function multiplying modules 22a, 22b and 22c, and one frequency analyzing module 123 instead of the three frequency analyzing modules 23a, 23b and 23c. In addition, the signal processor 110 has a configuration in which the absolute value calculating module 24, the minimum value selecting module 25, and the data selecting module 26 are omitted.

In the signal processor 110 according to the comparative example, beat signal BS is generated by the beat signal generating module 12 having the same configuration as the embodiment. The signal processor 110 extracts from the beat signal a signal included in the basic gate interval $G_2$ which synchronizes with the cycle of the transmission signal, as the processing target signal. The signal processor 110 generates the image signal by the target object information generating module 40 which has a similar configuration to the embodiment, processing the processing target signals thus selected.

As illustrated in FIG. 9, in the echo image generated by the underwater detection apparatus according to the comparative example, a plurality of long and narrow virtual image C extending upwardly or downwardly from an echo image B of a seabed may be displayed. Once such a virtual image C is displayed, it is not possible to recognize an exact shape of the echo image B of the seabed, and it is also not possible to detect fish located near the seabed.

The present inventors discovered a cause of the generation of the virtual image C. Specifically, the present inventors discovered that the virtual image C is caused in the conventional underwater detection apparatus using dual demodulation, by range side lobes which appear when there is a beat signal phase jump timing JP (specifically, when there is a position at which the phase of the beat signal is discontinuous) near the center of the basic gate interval $G_2$ of which the cycle is given, as illustrated in FIG. 7.

Figure 10:
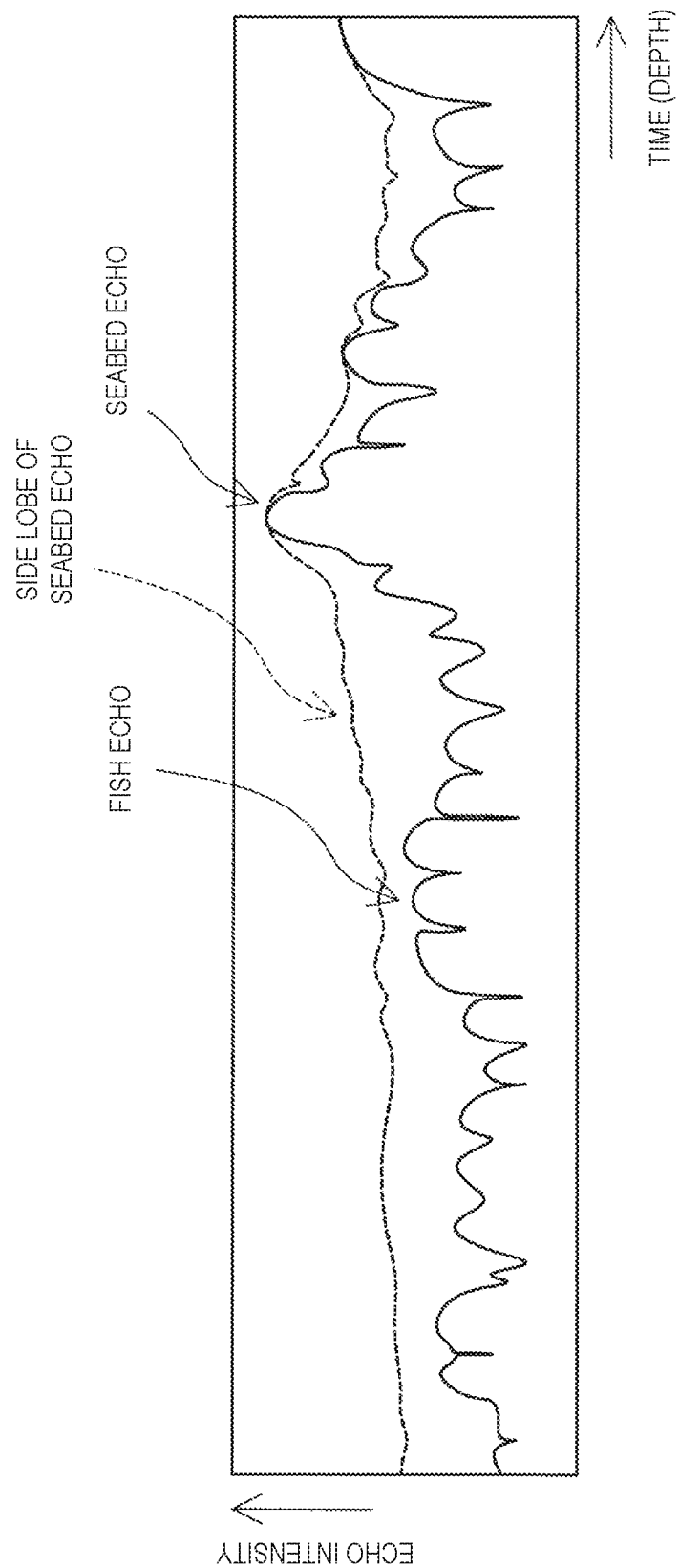
FIG. 10 is a graph where a graph which is generated by the signal processor of this embodiment and which illustrates an echo intensity from each depth position at the time of a given ping, and a graph which is generated by the signal processor of the comparative example and which illustrates an echo intensity from each depth position at the time of a given ping, are illustrated in an overlapped manner.

FIG. 10 is a graph where a graph which is generated by the signal processor 10 of the embodiment and which illustrates an echo intensity from each depth position at the time of a given ping (illustrated by a solid line in FIG. 10), and a graph which is generated by the signal processor 110 of the comparative example and which illustrates an echo intensity from each depth position at the time of a given ping (illustrated by a dashed line in FIG. 10), are illustrated in an overlapped manner.

In the underwater detection apparatus according to the comparative example, when there is the beat signal phase jump timing JP near the central part of the basic gate interval $G_2$ (G2 having a given cycle) as a section from which the processing target signal is extracted, large side lobes appear near the seabed echo as illustrated by the dashed line in the graph of FIG. 10 and, thus, target objects near the seabed are buried therein.

On the other hand, in the underwater detection apparatus 1 according to the embodiment, the virtual image C is removed by reducing the range side lobes as follows. Specifically, in this embodiment, the signal with the smallest absolute value is selected as the processing target signal among the signals extracted from the three gate intervals $G_1$-$G_3$ having different timings, respectively. That is, in this embodiment, the processing target signals are extracted from the gate intervals $G_1$-$G_3$ asynchronously from the transmitting cycle of the transmission signal. Thus, even if the beat signal phase jump timing JP appears near the central part of a certain gate interval, the side lobes of the seabed echo are reduced because the signals extracted from other gate intervals are selected. Therefore, as illustrated by the solid line in the graph of FIG. 10, target objects which exist near the seabed (e.g., fish located near the seabed) are detectable.

Effects

As described above, the underwater detection apparatus 1 according to this embodiment extracts the processing target signals from the beat signals BS asynchronously from the transmitting cycle of the transmission signal, and generates the information on the target objects (in this embodiment, the underwater echo image) based on the processing target signals. Therefore, it prevents the target objects to be detected from being buried in the side lobes as the side lobes caused by the seabed echo are reduced.

That is, the underwater detection apparatus 1 prevents the omission in detection of the target objects as the side lobes that appear in connection with the peak waveform of the target objects are reduced.

In addition, the underwater detection apparatus 1 selects the processing target signals from the extracted beat signals Sa, Sb and Sc included in the plurality of gate intervals $G_1$-$G_3$, respectively. Thus, the processing target signals, asynchronous with the transmitting cycle of the transmission signal are extracted easily.

In addition, the underwater detection apparatus 1 selects as the processing target signals the window processed signals $Sa_n$, $Sb_n$ and $Sc_n$ corresponding to the complex data with the smallest absolute values among the complex data obtained by carrying out the frequency conversion of the window processed signals $Sa_n$, $Sb_n$ and $Sc_n$, respectively. Therefore, the influence of the side lobes is reduced and, thus the omission in detection of the target object is prevented.

In addition, in the underwater detection apparatus 1, at least two of the plurality of gate intervals $G_1$-$G_3$ (in this embodiment, the front gate interval $G_1$ and the basic gate interval $G_2$, and the basic gate interval $G_2$ and the rear gate interval $G_3$) overlap partially in the time domain. Thus, it is prevented that the echo intensities of the target objects change largely for each ping.

In addition, in the underwater detection apparatus 1, the window processed signals $Sa_n$, $Sb_n$ and $Sc_n$ which are acquired by multiplying the extracted beat signals Sa, Sb and Sc by the window functions serve as candidates of the processing target signals, respectively. Thus, the processing target signals from which the influence of the side lobes is further reduced are acquired.

In addition, the underwater detection apparatus 1 reduces the side lobes that appear in connection with the peak waveform of the target objects and, thus, prevents the omission in detection of the target objects.

Modifications

As described above, the embodiment of the present disclosure is described; however, the present disclosure is not limited to the embodiment and various changes may be made to the present disclosure without departing from the scope thereof.

Figure 11:
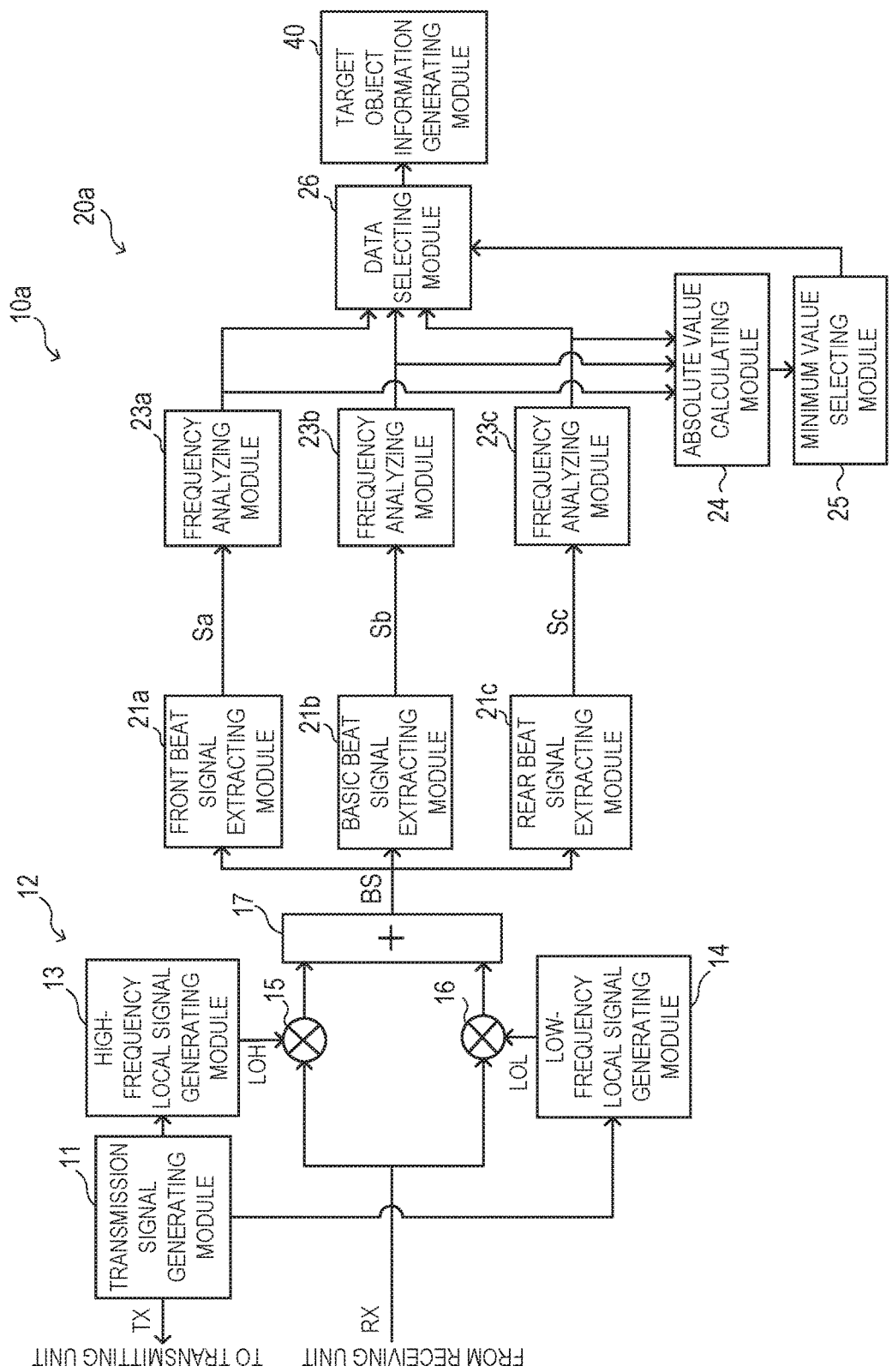
FIG. 11 is a block diagram illustrating a configuration of a signal processor of an underwater detection apparatus according to one modification.

(1) FIG. 11 is a block diagram illustrating a configuration of a signal processor 10a of an underwater detection apparatus according to one modification. Although the processing target signal extracting module 20 of the signal processor 10 of the above embodiment is provided with the window function multiplying modules 22a, 22b and 22c between the beat signal extracting modules 21a, 21b and 21c, and the frequency analyzing modules 23a, 23b and 23c, respectively, as illustrated in the processing target signal extracting module 20a in FIG. 11, the window function multiplying module may however be omitted from the configuration. With such a modification, since the gate intervals can be set to avoid the beat signal phase jump timing JP, the side lobes that appear in connection with the peak waveform of the target objects are reduced similarly to the above embodiment.

Figure 12:
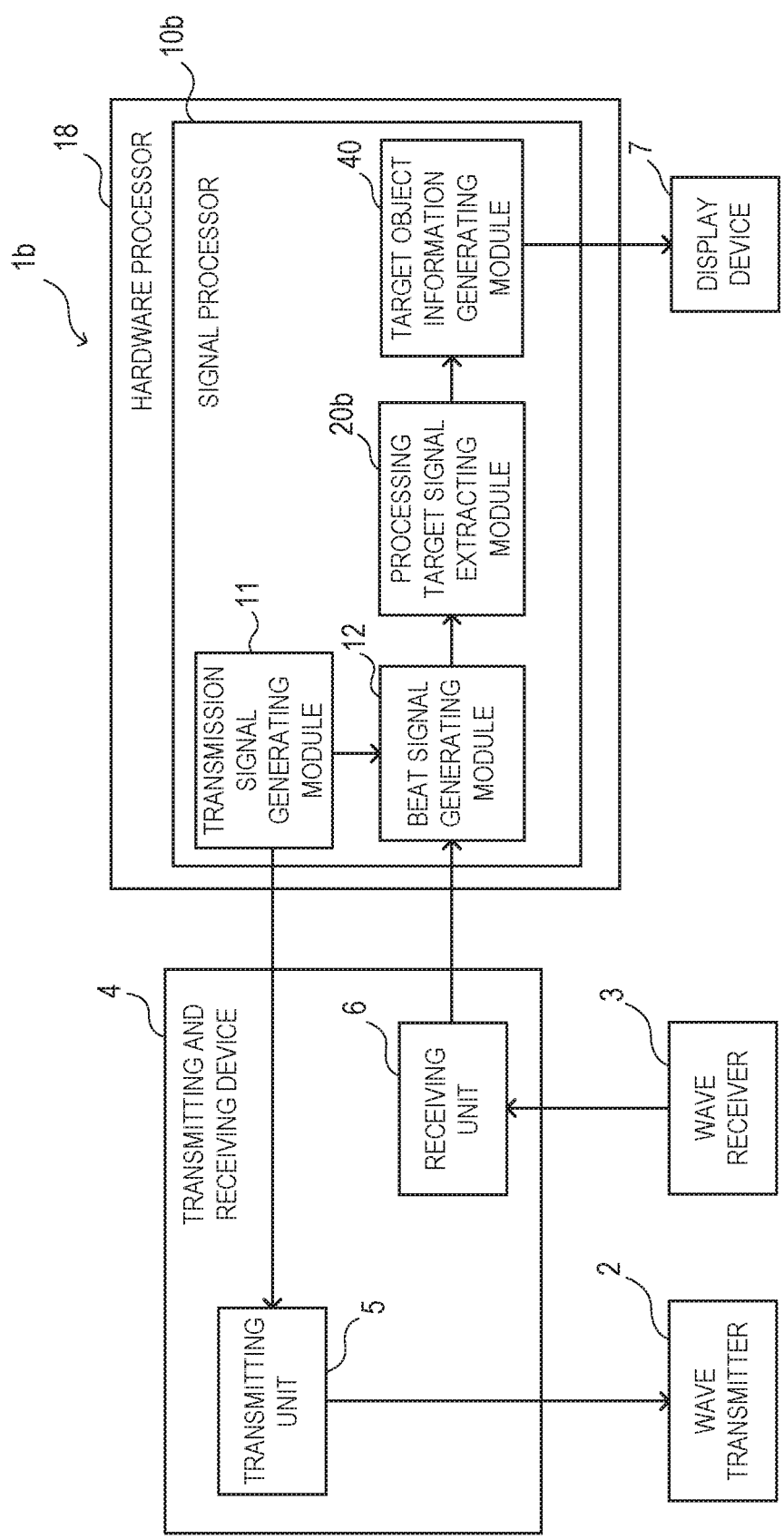
FIG. 12 is a block diagram illustrating a configuration of an underwater detection apparatus according to another modification.

(2) FIG. 12 is a block diagram illustrating a configuration of an underwater detection apparatus 1b according to another modification. The underwater detection apparatus 1b according to this modification differs in the configuration of the processing target signal extracting module compared with the underwater detection apparatus 1 according to the above embodiment. Below, the modified portions which are different from the above embodiment are mainly described, and description of other portions is omitted.

Figure 13:
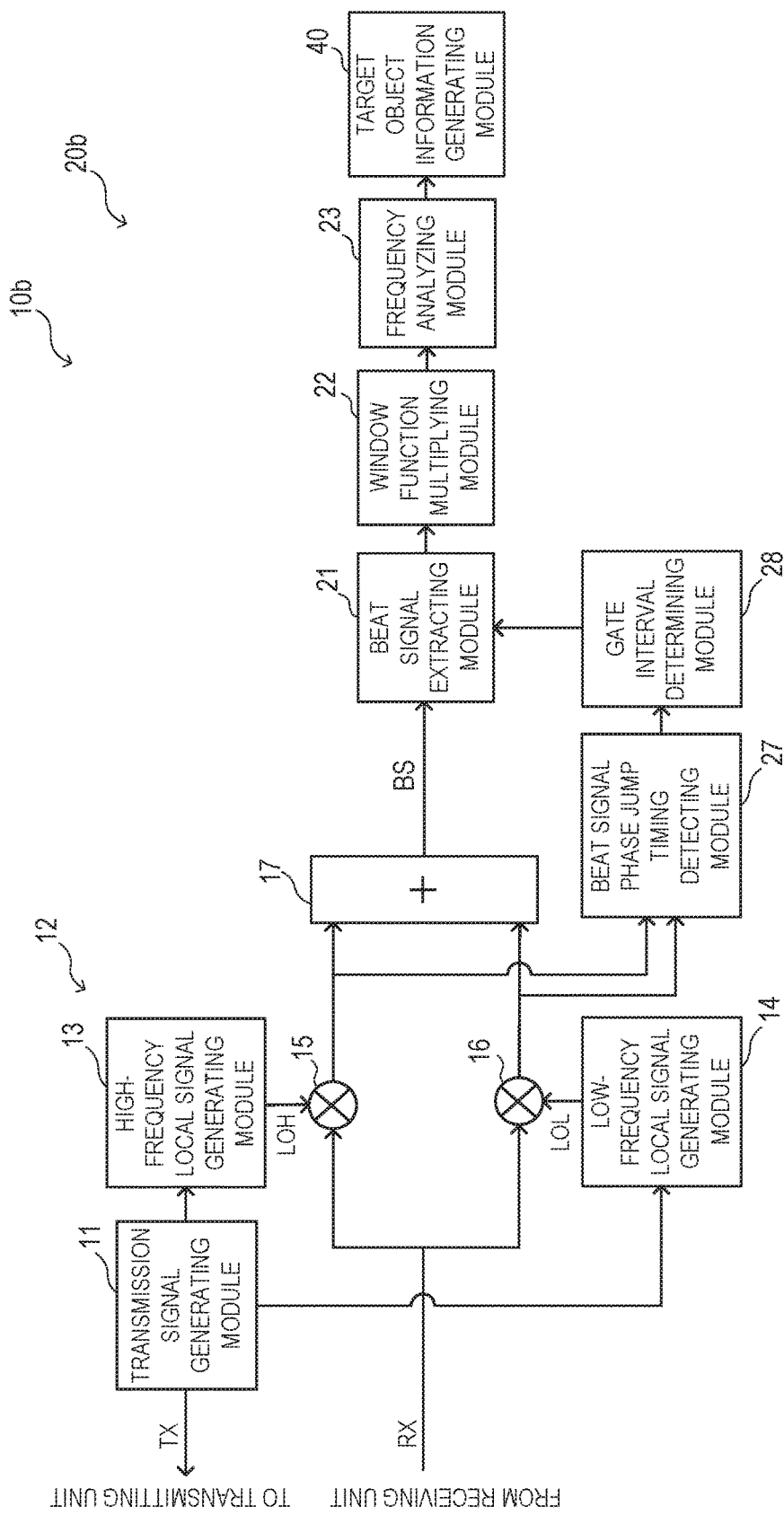
FIG. 13 is a block diagram illustrating a configuration of a signal processor in FIG. 12.

FIG. 13 is a block diagram illustrating a configuration of a signal processor 10b of the underwater detection apparatus 1b illustrated in FIG. 12. Although the processing target signal extracting module 20 of the above embodiment selects the signal with the smallest absolute value from the signals respectively extracted from the three gate intervals $G_1$-$G_3$ of which timings differ mutually, the present disclosure is not limited to this configuration. A processing target signal extracting module 20b of this modification, which will be described later in detail with reference to FIG. 14, detects the beat signal phase jump timing JP before determining the position of a gate interval $G_0$. Then, the position of the gate interval $G_0$ is determined so that a center time Ct of the gate interval $G_0$ is shifted from the beat signal phase jump timing JP.

The processing target signal extracting module 20b of this modification includes a beat signal phase jump timing detecting module 27, a gate interval determining module 28, a beat signal extracting module 21, a window function multiplying module 22, and a frequency analyzing module 23.

The beat signal phase jump timing detecting module 27 detects the beat signal phase jump timing JP. Specifically, the beat signal phase jump timing detecting module 27 is inputted with an output signal from the first multiplying module 15 (specifically, a signal having a frequency difference between the high-frequency local signal LOH and the reception signal RX as a frequency component, among signals obtained by mixing LOH and RX), and an output signal from the second multiplying module 16 (specifically, a signal having a frequency difference between the low-frequency local signal LOL and the reception signal RX as a frequency component, among signals obtained by mixing LOL and RX). Then, for example, the beat signal phase jump timing detecting module 27 sequentially calculates an instant phase of each output signal, and detects time points at which the instant phases change largely, as the beat signal phase jump timings JP.

Figure 14:
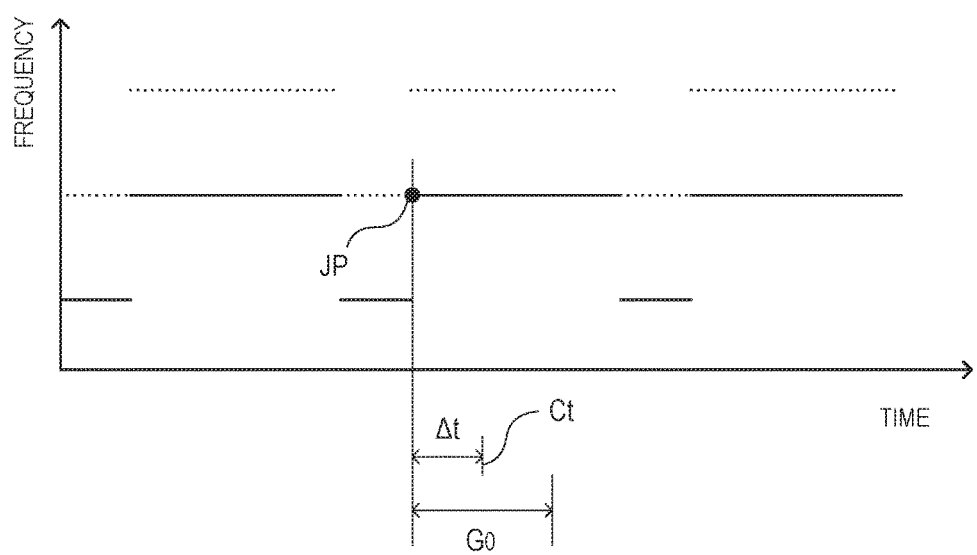
FIG. 14 is a graph illustrating a time relation between a beat signal phase jump timing and a gate interval determined by a gate interval determining module.

FIG. 14 is a view illustrating a time relation between the beat signal phase jump timing JP and the gate interval $G_0$ determined by the gate interval determining module 28.

As illustrated in FIG. 14, the gate interval determining module 28 determines the position of the gate interval $G_0$ so that the center time Ct of the gate interval $G_0$ is shifted from the beat signal phase jump timing JP. For example, the gate interval determining module 28 determines the position of the gate interval $G_0$ so that a shifted amount of the center time Ct of the gate interval $G_0$ from the beat signal phase jump timing JP (i.e., a time interval) becomes a given time Δt. Alternatively, the gate interval determining module 28 may determine the position of the gate interval $G_0$ so that the beat signal phase jump timing JP is not contained in the gate interval $G_0$. Therefore, the side lobes can be greatly reduced. Alternatively, the gate interval determining module 28 may determine the position of the gate interval $G_0$ so that the beat signal phase jump timing JP is contained in an end portion of the gate interval $G_0$. Thus, if the beat signal phase jump timing JP is contained in the end portion of the gate interval $G_0$, the side lobes can be reduced to some extent by the downstream window function multiplying module 22. Therefore, variations of the echo intensity between pings resulting from the asynchrony and the virtual image resulting from the side lobes can be both reduced to some extent.

The beat signal extracting module 21 extracts a portion contained in the gate interval $G_0$ determined by the gate interval determining module 28 from the beat signal BS as the extracted beat signal, and outputs it to the window function multiplying module 22. The window function multiplying module 22 multiplies the signal outputted from the beat signal extracting module 21 by a given window function, and outputs it to the frequency analyzing module 23. The frequency analyzing module 23 outputs the complex data obtained by conducting a frequency analysis of the signal outputted from the window function multiplying module 22 to the target object information generating module 40 as IQ echo data.

As described above, the underwater detection apparatus 1b determines the gate interval $G_0$ so that the center time Ct of the gate interval $G_0$ is shifted from the beat signal phase jump timing JP detected based on the output signal from the first multiplying module 15 and the output signal from the second multiplying module 16. Such a determination of the gate interval $G_0$ also reduces the side lobes that appear in connection with the peak waveform of the target objects, similar to the above embodiment.

In addition, the underwater detection apparatus 1b sequentially calculates the instant phase of the output signals from the first multiplying module 15 and the second multiplying module 16 (specifically, an amount of change in the phase of the beat signal), and detects a time point at which the instant phase changes largely as the beat signal phase jump timing JP, thus enabling the beat signal phase jump timing JP to be calculated.

In the present modification, the beat signal phase jump timing detecting module 27 detects the time when the instant phase of the output signal from the first multiplying module 15 and the output signal from the second multiplying module 16 changes largely as the beat signal phase jump timing JP. Alternatively, instant frequencies of the output signal from the first multiplying module 15 and the output signal from the second multiplying module 16 (specifically, an amount of change in the frequency of the beat signal), or an instant frequency of the reception signal RX from the receiving unit 6 (specifically, an amount of change in the frequency of the reception signal RX) may be detected, and a time point at which the instant frequency or frequencies change largely may be detected as the beat signal phase jump timing, thus enabling the beat signal phase jump timing JP to be calculated, similarly to the calculation described above.

Figure 15:
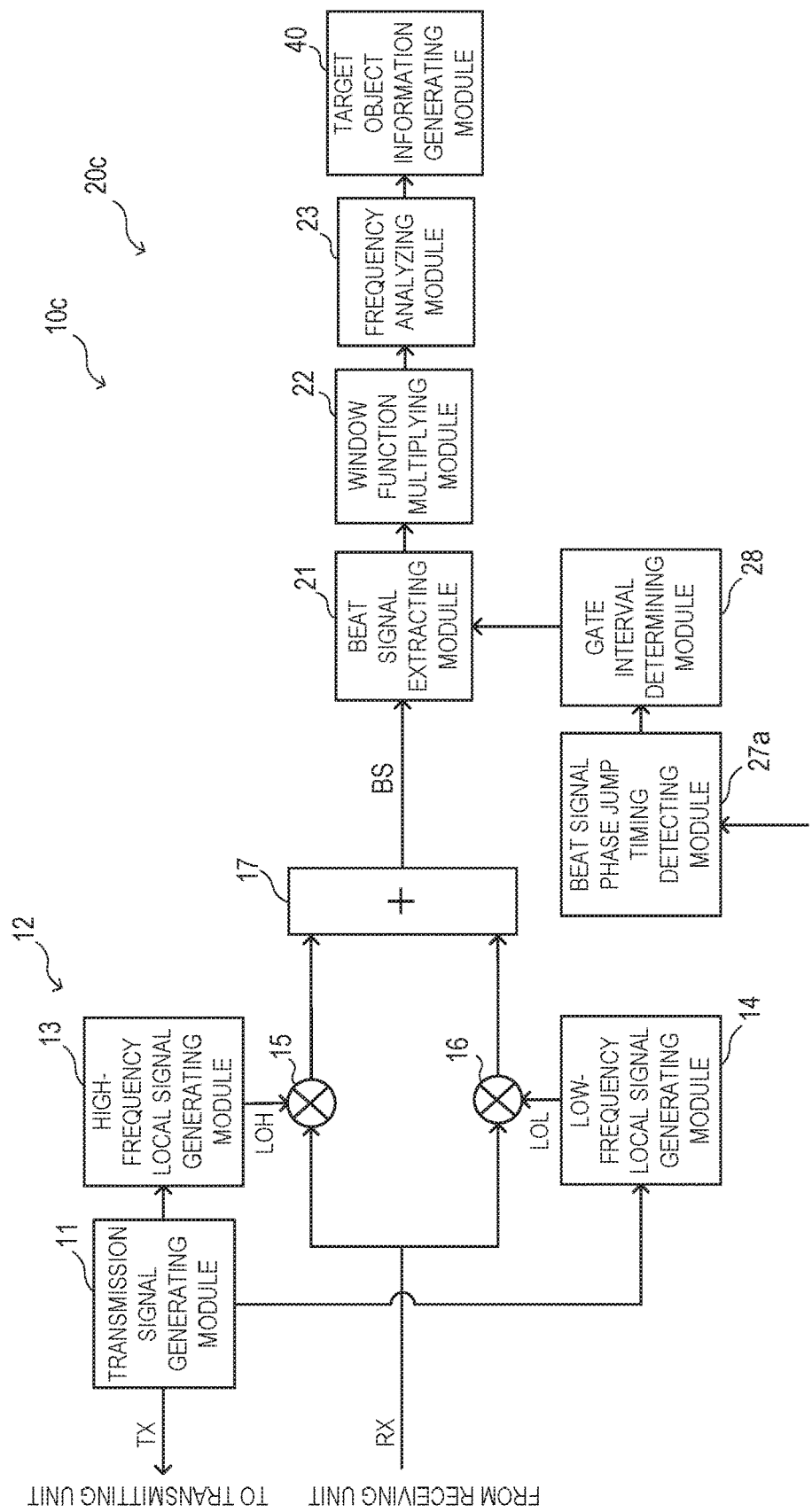
FIG. 15 is a block diagram illustrating a configuration of a signal processor of an underwater detection apparatus according to another modification.

(3) FIG. 15 is a block diagram illustrating a configuration of a signal processor 10c of an underwater detection apparatus according to another modification. The signal processor 10c according to this modification differs in the configuration and operation of the beat signal phase jump timing detecting module, compared with the processing target signal extracting module 20b of the signal processor 10b illustrated in FIG. 13. Specifically, the beat signal phase jump timing detecting module 27 illustrated in FIG. 13 detects the beat signal phase jump timing JP based on the output signal from each of the multiplying modules 15 and 16. On the other hand, a beat signal phase jump timing detecting module 27a of this modification detects the beat signal phase jump timing JP based on information from a system outside the underwater detection apparatus. For example, a depth position of a seabed which is obtained from position information of the ship (provided with the underwater detection apparatus) obtained from GPS, nautical chart(s), water depth or depth contour line data, etc. is inputted into the beat signal phase jump timing detecting module 27a. The beat signal phase jump timing detecting module 27a detects the beat signal phase jump timing JP based on the depth position of the seabed. Such a configuration also reduces the side lobes that appear in connection with the peak waveform of the target objects, similar to the above embodiment.

Figure 16:
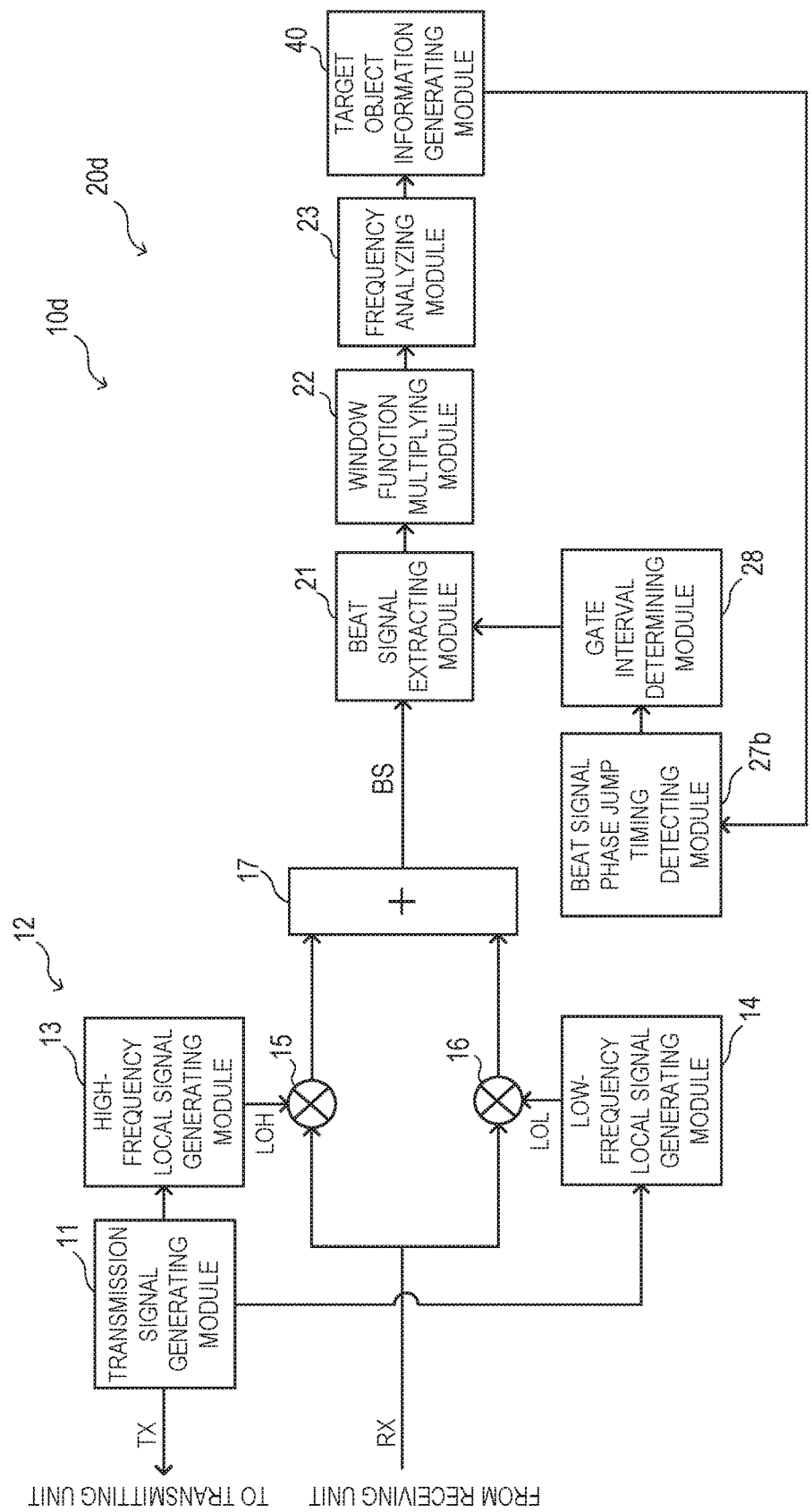
FIG. 16 is a block diagram illustrating a configuration of a signal processor of an underwater detection apparatus according to another modification.

(4) FIG. 16 is a block diagram illustrating a configuration of a signal processor 10d of an underwater detection apparatus according to another modification. The processing target signal extracting module 20c of the modification illustrated in FIG. 15 detects the beat signal phase jump timing JP based on the information from the system outside the underwater detection apparatus, the present disclosure is not limited to this configuration. Alternatively, a beat signal phase jump timing detecting module 27b of a processing target signal extracting module 20d of this modification determines the beat signal phase jump timing JP at a certain ping based on information on the depth position of the seabed in a previous ping, which is detected by the target object information generating module 40. For example, the beat signal phase jump timing JP at a certain ping is determined based on the depth position of the seabed at a ping which is one ping before the current ping (specifically, a peak depth position with the highest level of echo at the previous ping). Such a configuration also reduces the side lobes that appear in connection with the peak waveform of the target objects, similar to the above embodiment.

Figure 17:
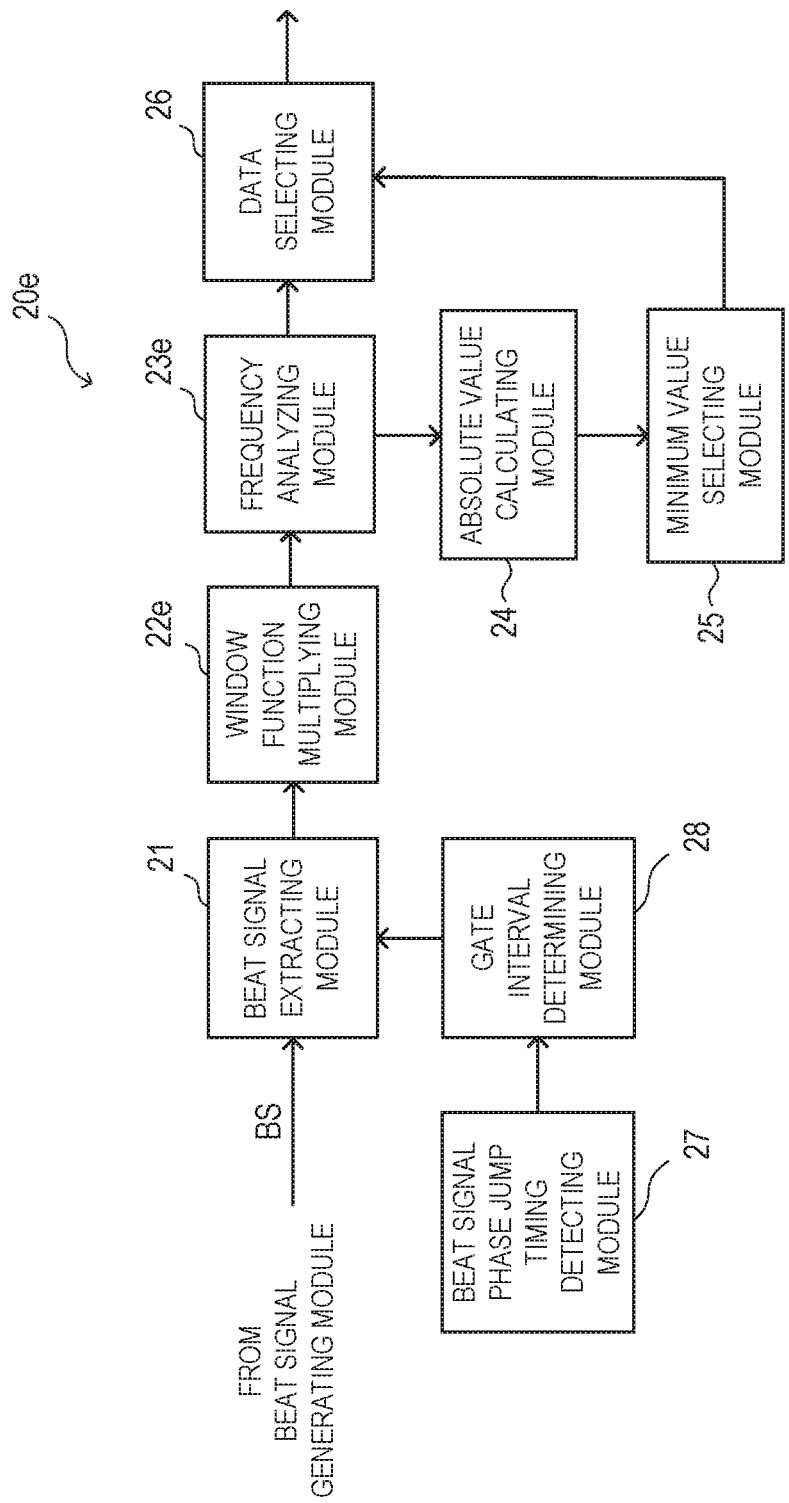
FIG. 17 is a block diagram illustrating a configuration of a processing target signal extracting module of an underwater detection apparatus according to another modification.

(5) FIG. 17 is a block diagram illustrating a configuration of a processing target signal extracting module 20e of an underwater detection apparatus according to another modification. The underwater detection apparatus according to this modification differs in the configuration of the processing target signal extracting module, compared with the underwater detection apparatus 1b according to the modification illustrated in FIG. 12. Specifically, a processing target signal extracting module 20e of this modification differs in operation of the window function multiplying module and the frequency analyzing module, compared with the processing target signal extracting module 20b illustrated in FIG. 13. Moreover, the processing target signal extracting module 20e further includes an absolute value calculating module 24, a minimum value selecting module 25, and a data selecting module 26, in addition to the configuration of the processing target signal extracting module 20b illustrated in FIG. 13.

Also in this modification, the gate interval is set so that the center time of the gate interval is shifted from the beat signal phase jump timing, similar to the modification illustrated in FIG. 12. The beat signal extracting module 21 extracts a signal included in the gate interval which is thus set, and outputs the extracted signal to the window function multiplying module 22e.

A plurality of window functions (e.g., N functions) are stored in the window function multiplying module 22e, similar to the window function multiplying modules 22a, 22b and 22c of the above embodiment. The window function multiplying module 22e multiplies the signal from the beat signal extracting module 21 by each of the N window functions to calculate the N window processed signals.

A frequency analyzing module 23e conducts a frequency analysis of each of the N window processed signals to generate N complex spectra.

The absolute value calculating module 24 calculates an absolute value of each complex data from the N complex spectra.

The minimum value selecting module 25 selects the smallest absolute value from the N absolute values calculated by the absolute value calculating module 24, and outputs the number assigned to the complex data from which the smallest absolute value has been calculated to the data selecting module 26 as a selected number at each depth position.

The data selecting module 26 outputs the complex data with the assigned number corresponding to the selected number outputted from the minimum value selecting module 25 to the target object information generating module 40 as a processing target signal. The data selecting module 26 sequentially outputs the processing target signal selected for each depth position to the target object information generating module 40 as IQ echo data.

As described above, the underwater detection apparatus according to this modification sets suitable gate intervals because it sets the gate intervals so as to avoid the beat signal phase jump timing JP, similar to the modification illustrated in FIG. 12.

Moreover, the underwater detection apparatus of this modification applies the plurality of window functions to the extracted beat signals extracted by the beat signal extracting module 21 to generate a plurality of window processed signals. Then, the absolute values of the complex data obtained from the plurality of window processed signals are calculated, and a window processed signal with the smallest absolute value is selected as a processing target signal. Thus, since the extracted beat signal to which the window function which enables the best side lobe reduction is applied is selected as the processing target signal, the side lobes can be reduced more appropriately.

Figure 18:
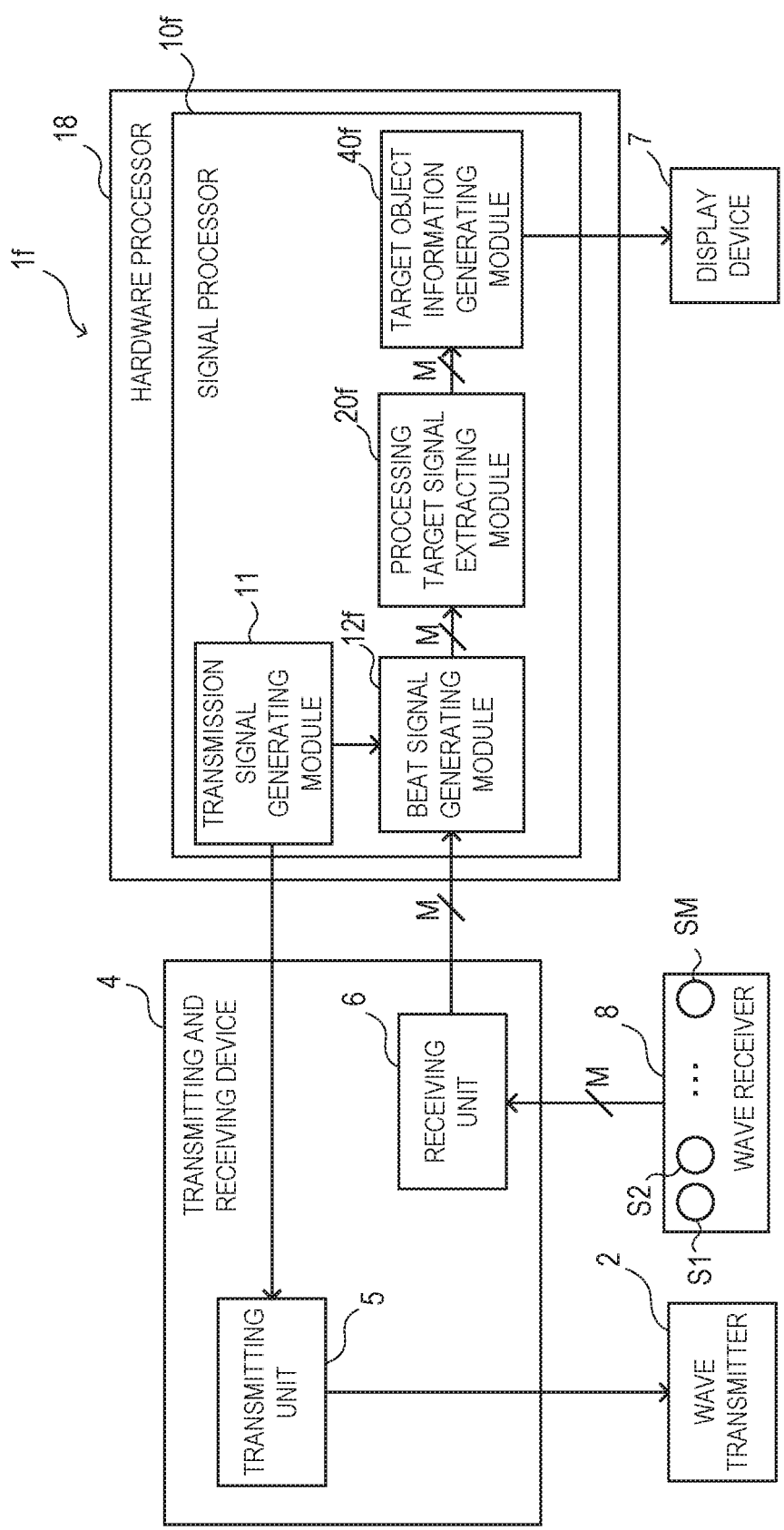
FIG. 18 is a block diagram illustrating a configuration of an underwater detection apparatus according to another modification.
Figure 19:
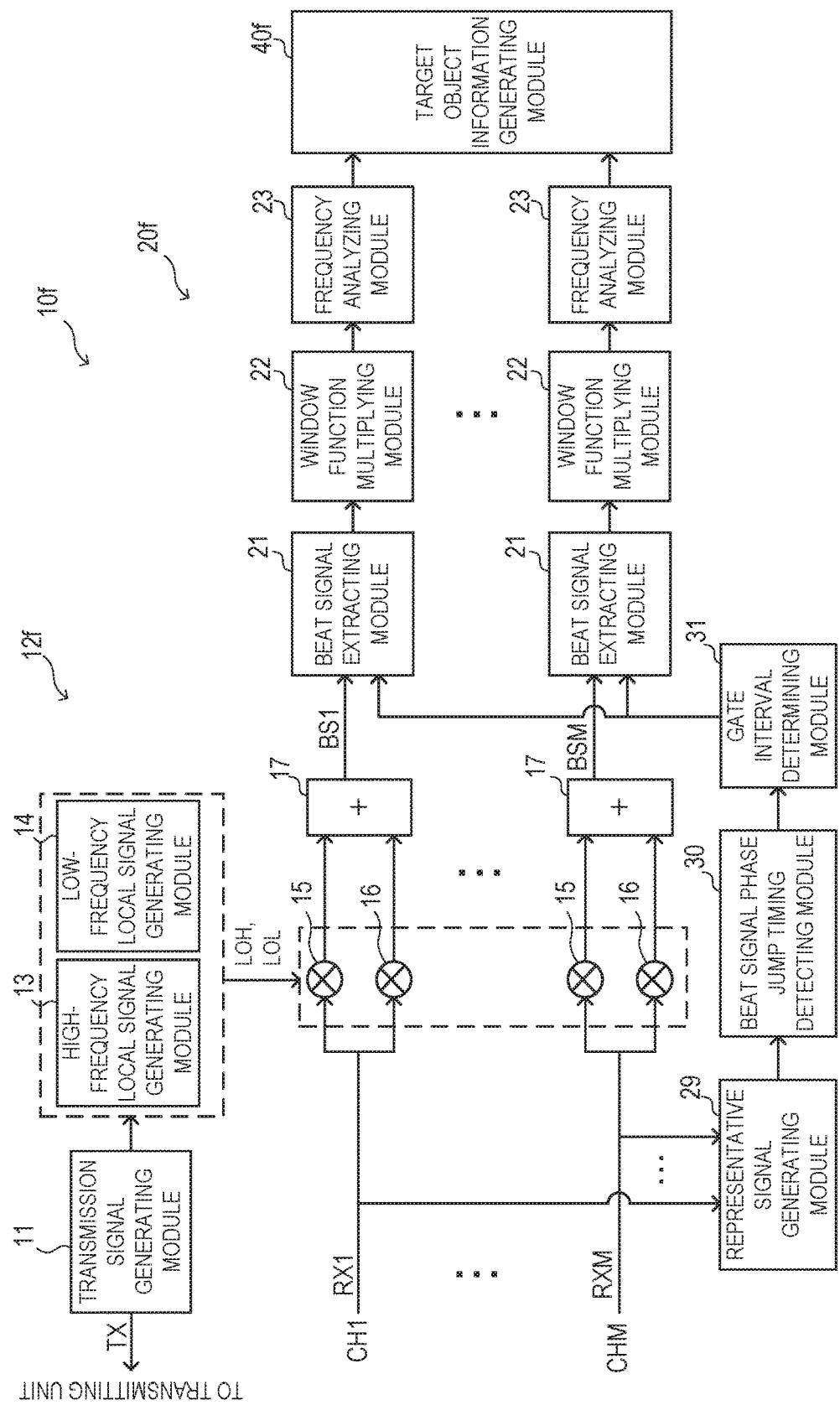
FIG. 19 is a block diagram illustrating a configuration of a signal processor of FIG. 18.

(6) FIG. 18 is a block diagram illustrating a configuration of an underwater detection apparatus 1f according to another modification. FIG. 19 is a block diagram illustrating a signal processor 10f of FIG. 18. The underwater detection apparatus 1f according to this modification differs greatly in the configuration of the wave receiver and the signal processor, compared with the underwater detection apparatus 1 according to the above embodiment. Below, portions different from the above embodiment are mainly described, and description of other portions is omitted.

A wave receiver 8 includes ultrasonic elements Sm (m=1, 2, . . . , M) as a plurality of wave receiving elements (in this modification, M elements) linearly arranged. The ultrasonic elements Sm are fixed to the ship bottom so that receiving surfaces which receive the ultrasonic wave are exposed underwater. Ultrasonic waves received by the respective ultrasonic elements Sm are outputted to the signal processor 10f through channels CHm provided corresponding to the M ultrasonic elements Sm, respectively, after being converted into electrical signals as the reception signals and being amplified and A/D converted by the receiving unit 6.

The signal processor 10f includes a transmission signal generating module 11, a beat signal generating module 12f, a processing target signal extracting module 20f, and a target object information generating module 40f. The transmission signal generating module 11 generates a transmission signal which is a basis of the transmission wave to be transmitted from the wave transmitter 2, similar to the above embodiment. The transmission signal is transmitted to the transmitting unit 5 and the beat signal generating module 12f.

The beat signal generating module 12f generates the beat signals BSm based on the reception signals RXm from the ultrasonic elements Sm, which are inputted through the channels CHm (m=1, 2, . . . , M), respectively. The beat signal generating module 12f includes a high-frequency local signal generating module 13, a low-frequency local signal generating module 14, M first multiplying modules 15, M second multiplying modules 16, and M adding modules 17.

The high-frequency local signal generating module 13 generates a high-frequency local signal LOH, similar to the above embodiment, and the low-frequency local signal generating module 14 generates a low-frequency local signal LOL, similar to the above embodiment. The high-frequency local signal LOH is outputted to each of the plurality of first multiplying modules 15 provided corresponding to the channels CHm, respectively. On the other hand, the low-frequency local signal LOL is outputted to each of the plurality of second multiplying modules 16 provided corresponding to the channels CHm, respectively.

Each first multiplying module 15 is inputted with a reception signal RXm from a corresponding ultrasonic element Sm, and a high-frequency local signal LOH generated by the high-frequency local signal generating module 13. These signals are mixed by each first multiplying module 15. Each first multiplying module 15 extracts a signal having a difference between the frequency of the high-frequency local signal LOH and the frequency of the reception signal RXm as a frequency component from the mixing result, and outputs the extracted signal to the adding module 17.

Each second multiplying module 16 is inputted with the reception signal RXm from the corresponding ultrasonic element Sm, and the low-frequency local signal LOL generated by the low-frequency local signal generating module 14. These signals are mixed by each second multiplying module 16. Each second multiplying module 16 then extracts a signal having a difference between the frequency of the low-frequency local signal LOL and the frequency of the reception signal RXm as a frequency component from the mixing result, and outputs the extracted signal to the adding module 17.

Each adding module 17 adds the signal outputted from the first multiplying module 15 to the signal outputted from the second multiplying module 16. Each adding module 17 outputs the added results as the beat signal BSm to the beat signal extracting module 21 provided corresponding to the adding module 17, respectively.

The processing target signal extracting module 20*f* includes M beat signal extracting modules 21, M window function multiplying modules 22, M frequency analyzing modules 23, a representative signal generating module 29, a beat signal phase jump timing detecting module 30, and a gate interval determining module 31.

The representative signal generating module 29 generates a representative signal of the reception signals RXm acquired from the ultrasonic elements Sm (m=1, 2, . . . , M). For example, the representative signal generating module 29 generates the representative signal by summing all the reception signals RXm. Note that the representative signal generating module 29 may also generate the representative signal by other methods. For example, the reception signal from a given ultrasonic transducer among the M ultrasonic elements Sm (e.g., an ultrasonic transducer located at the center among the ultrasonic elements linearly arranged) may also be used as the representative signal. Alternatively, the representative signal may be generated by summing the reception signals acquired from the ultrasonic transducers other than the ultrasonic elements located at the ends of the ultrasonic element array.

The beat signal phase jump timing detecting module 30 detects a position at which a phase jump of the beat signal occurs in the representative signal generated by the representative signal generating module 29. For example, the beat signal phase jump timing detecting module 30 sequentially calculates the instant frequency of the representative signal, and detects the time point at which the instant frequency changes largely as the beat signal phase jump timing. Note that the method of detecting the beat signal phase jump timing by the beat signal phase jump timing detecting module 30 may be other methods described herein.

The gate interval determining module 31 determines the position of the gate interval so that the center time of the gate interval is shifted from the beat signal phase jump timing, similar to the modification described with reference to FIGS. 12 to 14. For example, the position of the gate interval is determined so that a shifted amount of the center time of the gate interval from the beat signal phase jump timing (i.e., a time interval) becomes a given time, similar to the above modification. Note that the gate interval determining module 31 may determine the position of the gate interval so that the beat signal phase jump timing JP is not contained in the gate interval. The gate interval determined by the gate interval determining module 31 is notified to each beat signal extracting module 21.

Each beat signal extracting module 21 extracts a portion contained in the gate interval determined by the gate interval determining module 31 from the beat signal BSm inputted through the corresponding channel CHm, and outputs the extracted portion to the corresponding window function multiplying module 22. The window function multiplying module 22 multiplies the signal outputted from the corresponding beat signal extracting module 21 by the given window function, and outputs it to the corresponding frequency analyzing module 23. The frequency analyzing module 23 outputs the complex data obtained by conducting a frequency analysis of the signal outputted from the corresponding window function multiplying module 22 to the target object information generating module 40*f* as IQ echo data. Thus, IQ echo data generated corresponding to each reception signal RXm is inputted into the target object information generating module 40*f*.

The target object information generating module 40*f* calculates a direction and a distance of the target object with respect to the position of the ship based on the IQ echo data generated corresponding to each ultrasonic elements Sm, for example, by performing a beamforming. The target object information generating module 40*f* also generates the image signal under the ship based on the direction and the distance of the target object which are calculated as described above.

Figure 20A:
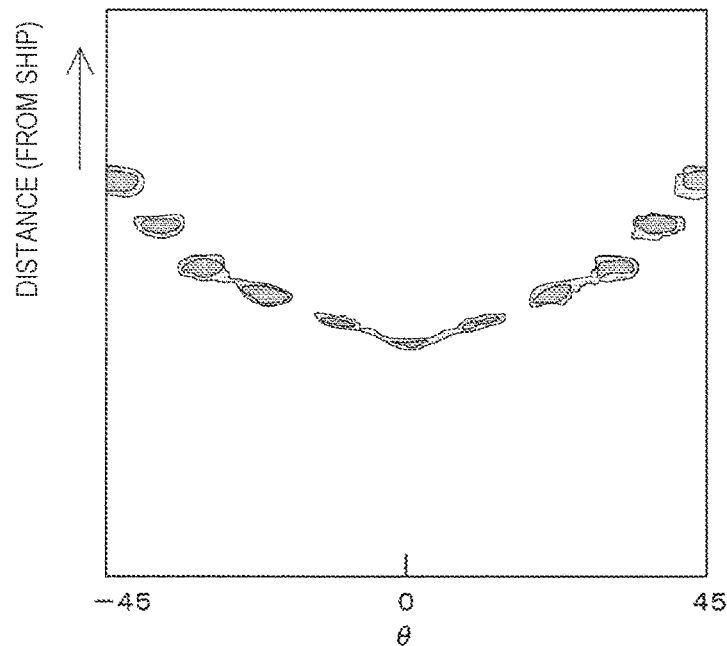
FIG. 20A is a view illustrating one example of a screen image displayed on a display device of FIG. 18.
Figure 20B:
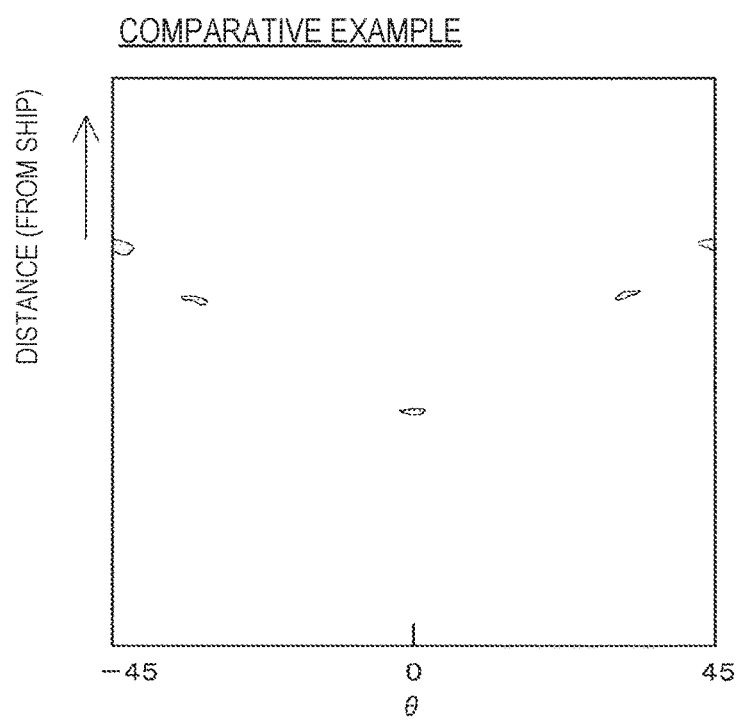
FIG. 20B is a view illustrating one example of a screen image displayed on a display device of an underwater detection apparatus according to one comparative example.

FIG. 20A is a view illustrating one example of the screen image displayed on the display device 7 of FIG. 18, and FIG. 20B is a view illustrating one example of a screen image displayed on a display device of an underwater detection apparatus according to one comparative example. FIGS. 20A and 20B illustrate detection results of operating each underwater detection apparatus when eleven target objects are placed under the ship.

The underwater detection apparatus according to the comparative example does not perform processing which generates the representative signal like the underwater detection apparatus if according to this modification, and processing which determines the suitable gate interval for the representative signal. As illustrated in FIG. 20B, such an underwater detection apparatus causes an omission in detection of the target objects. That is, the underwater detection apparatus according to the comparative example calculates IQ echo data of each channel (independently for each channel) based on the gate interval determined corresponding to each reception signal RXm, and carries out a beamforming of each IQ echo data. Thus, since the phases of IQ echo data are shifted from each other among the channels, the omission in detection of the target objects described above occurs.

On the other hand, in the underwater detection apparatus if according to this modification, the omission in detection does not occur, contrary to the underwater detection apparatus according to the comparative example and, therefore, all eleven target objects placed under the ship are detected.

As described above, the underwater detection apparatus if according to this modification also prevents the omission in detection of the target objects similar to the underwater detection apparatus 1 according to the above embodiment.

Moreover, the underwater detection apparatus if estimates the directions of the target objects by using the beamforming processing.

Figure 21:
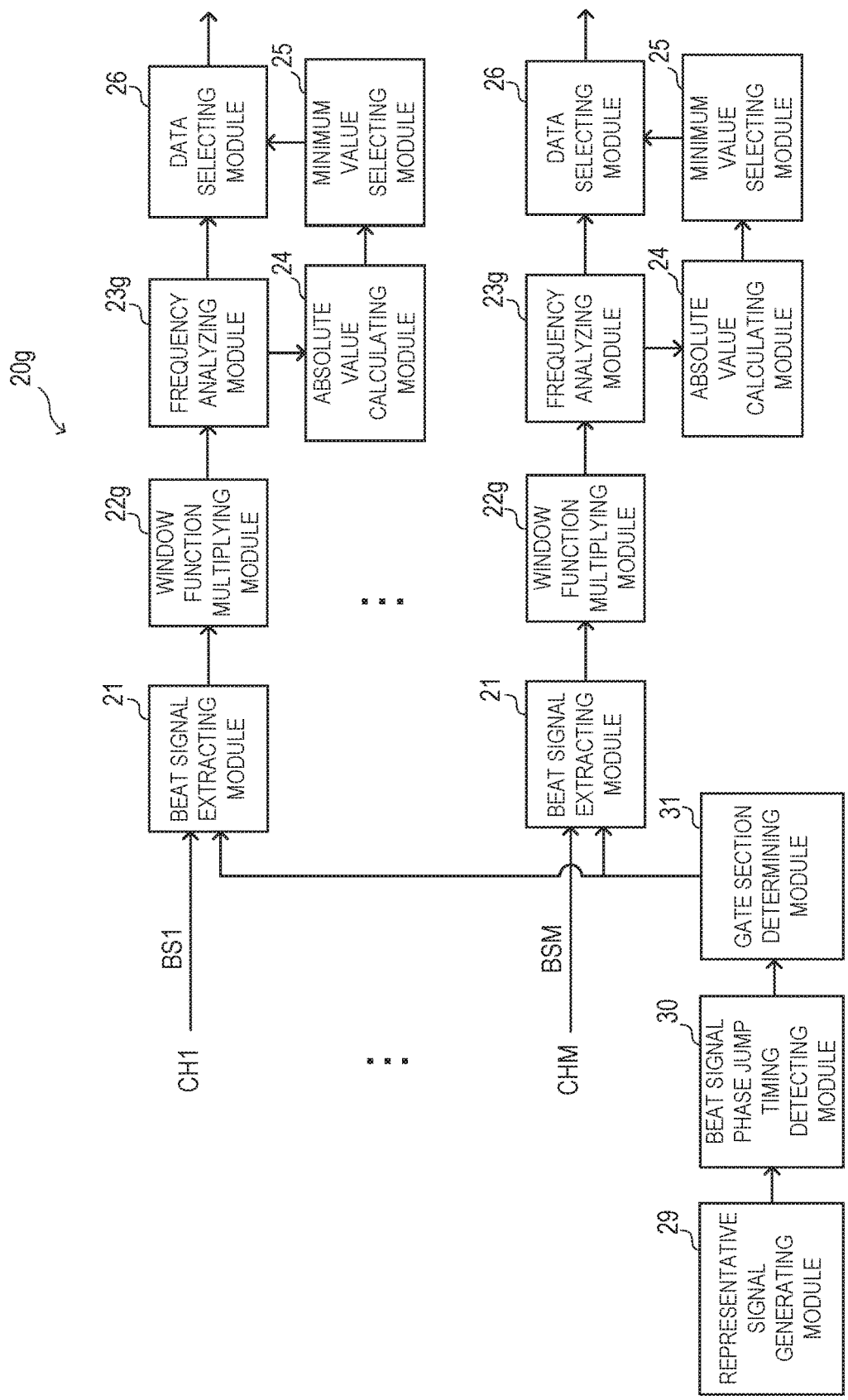
FIG. 21 is a block diagram illustrating a configuration of a processing target signal extracting module of an underwater detection apparatus according to another modification.

(7) FIG. 21 is a block diagram illustrating a configuration of a processing target signal extracting module 20*g* of an underwater detection apparatus according to another modification. The underwater detection apparatus according to this modification differs in operations of the window function multiplying module and the frequency analyzing module, compared with the processing target signal extracting module 20*f* illustrated in FIG. 19. Moreover, the processing target signal extracting module 20*g* further includes, for each channel, an absolute value calculating module 24, a minimum value selecting module 25, and a data selecting module 26, in addition to the configuration of the processing target signal extracting module 20*f* illustrated in FIG. 19. Note that, since configurations and operations of the absolute value calculating module 24, the minimum value selecting module 25, and the data selecting module 26 are the same as the configurations and the operations illustrated in FIG. 17, description thereof is omitted.

Also in this modification, the gate interval is set so that the center time of this gate interval is shifted from the beat signal phase jump timing of the representative signal, similar to the modification illustrated in FIG. 19. The beat signal extracting module 21, which is provided for each channel, extracts a signal included in the gate interval set as described above, and outputs the extracted signal to a corresponding window function multiplying modules 22g.

A plurality of window functions (e.g., N functions) are stored in each window function multiplying module 22g, similar to the window function multiplying modules 22a, 22b and 22c of the above embodiment. The window function multiplying modules 22g multiply the signals from the beat signal extracting modules 21 by the N window functions to calculate N window processed signals, respectively.

The frequency analyzing modules 23g conduct frequency analyses of the N window processed signals, and generate N complex spectra, respectively.

As described above, the underwater detection apparatus according to this modification prevents the omission in detection of target objects, similar to the underwater detection apparatus according to the modification illustrated in FIG. 19.

In addition, since the underwater detection apparatus according to this modification selects the extracted beat signal to which the window function that enables the best side lobe reduction is applied as the processing target signal, similar to the processing target signal extracting module 20e of the modification illustrated in FIG. 17, the side lobes can be reduced more appropriately.

(8) Although in some of the modifications described above the signal with the smallest absolute value is selected as the processing target signal from the plurality of signals which are candidates of the processing target signals, the processing target signals may also be determined using other determination criteria. For example, if determining the processing target signals at a given depth position, the processing target signals at the given depth position may be determined according to echo intensities at positions around the depth position.

(9) Although in the above embodiment the signal processor 10 performs the signal processing of the reception signal RX after the A/D conversion is carried out by the receiving unit 6, the signal processor 10 may also perform the signal processing of the reception signal before the A/D conversion.

(10) In the above embodiment, although the three gate intervals $G_1$-$G_3$ are set, two or four or more gate intervals may also be set. Moreover, although in the above embodiment, the overlap range of the basic gate interval $G_2$ and the front gate interval $G_1$ (or the rear gate interval $G_3$) is set to be the front half (or the rear half) of the basic gate interval $G_2$, the overlap range may be set more than or less than the half of the basic gate interval $G_2$.

Figure 22:
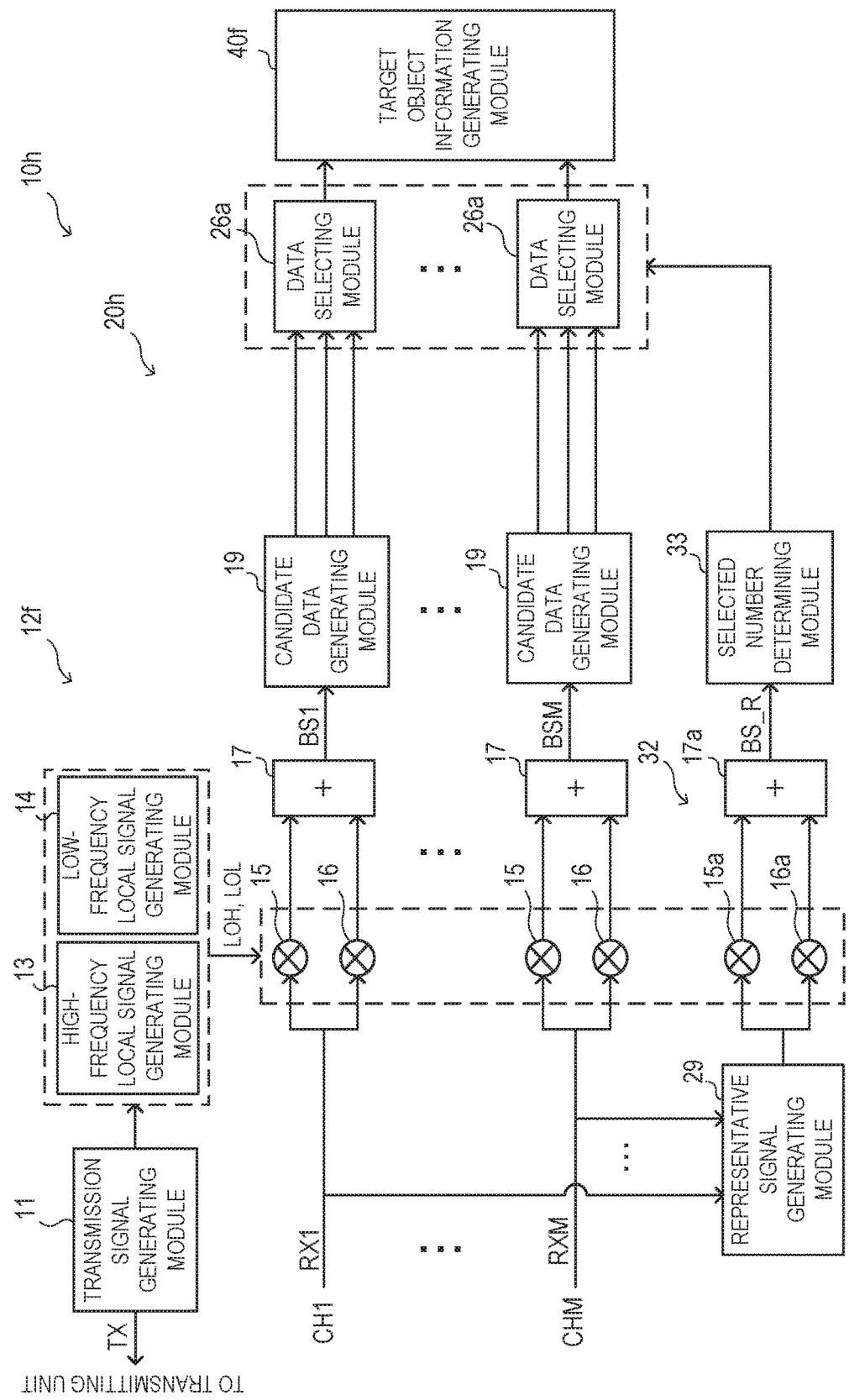
FIG. 22 is a block diagram illustrating a configuration of a signal processor of an underwater detection apparatus according to another modification.
Figure 23:
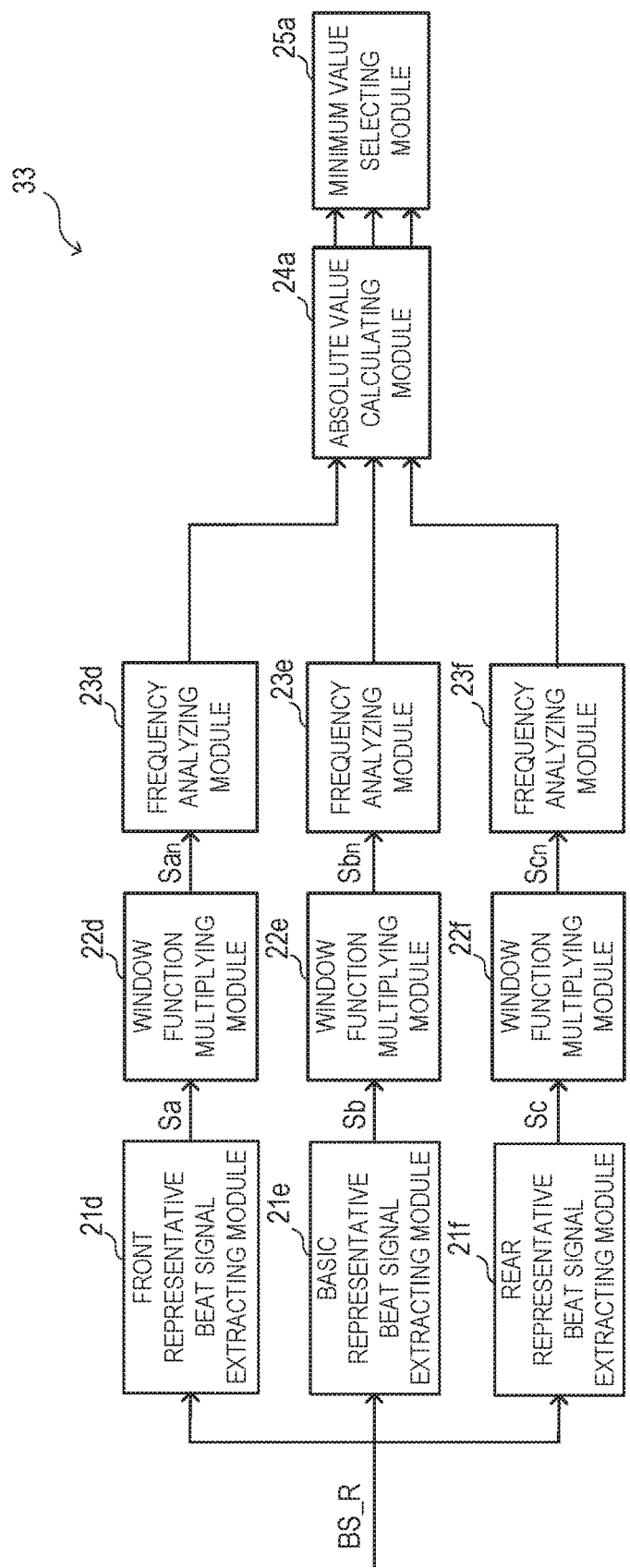
FIG. 23 is a block diagram illustrating a configuration of a selected number determining module of FIG. 22.
Figure 24:
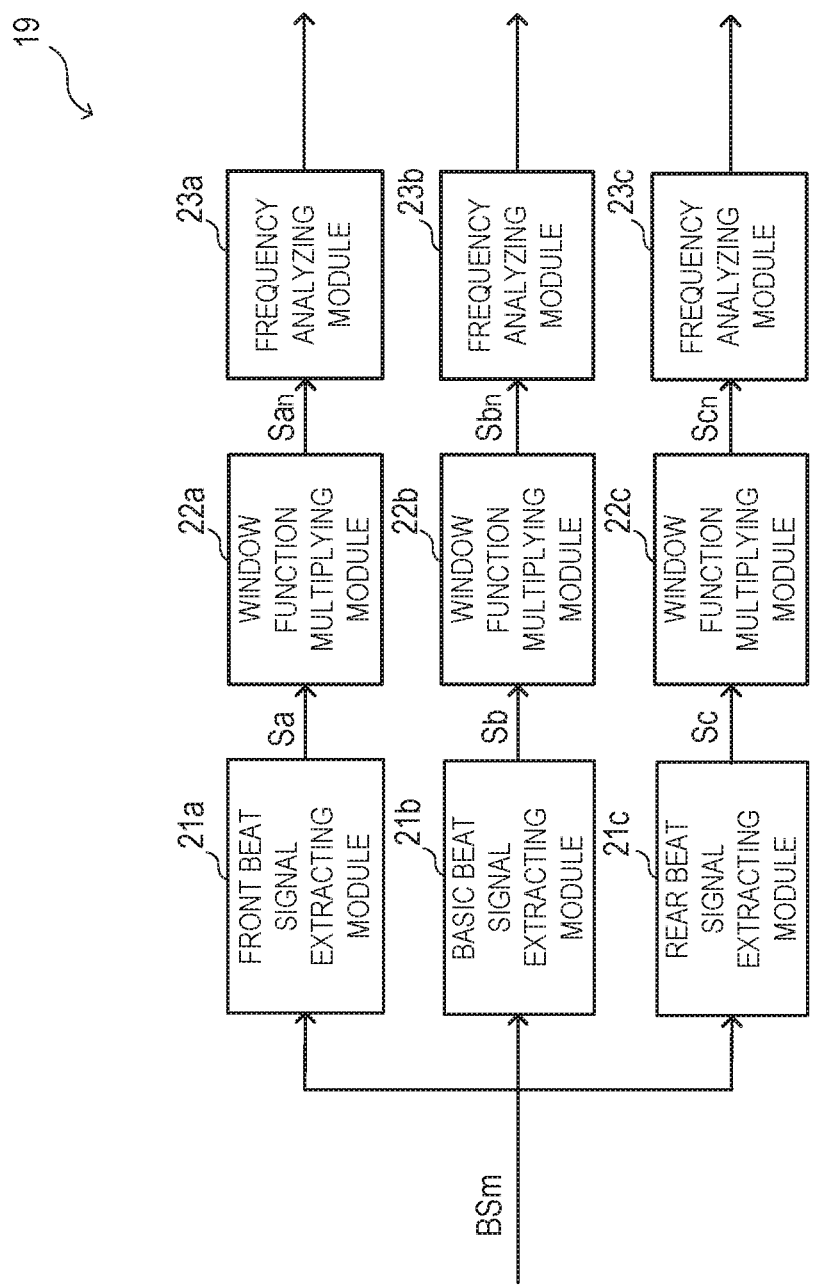
FIG. 24 is a block diagram illustrating a configuration of a candidate data generating module of FIG. 22.

(11) FIG. 22 is a block diagram illustrating a configuration of a signal processor 10h of an underwater detection apparatus according to another modification, FIG. 23 is a block diagram illustrating a configuration of a selected number determining module 33 of FIG. 22, and FIG. 24 is a block diagram illustrating a configuration of a candidate data generating module 19 of FIG. 22. The underwater detection apparatus 1f illustrated in FIG. 18 detects the beat signal phase jump timing based on the representative signal, and sets the suitable gate interval so as to avoid the beat signal phase jump timing (or so that the center of the gate interval is shifted from the beat signal phase jump timing) to reduce the side lobes. Alternatively, the following technique may also be used. This technique differs from the technique of the underwater detection apparatus 1f illustrated in FIG. 18 in the method of extracting the processing target signals for generating the echo image (i.e., a method of setting the gate interval). Below, a signal processor which is different from the modification illustrated in FIG. 18 is described, and description of other portions is omitted.

As illustrated in FIG. 22, a signal processor 10h of this modification includes a transmission signal generating module 11, a beat signal generating module 12f, a processing target signal extracting module 20h, and a target object information generating module 40f. Since the transmission signal generating module 11, the beat signal generating module 12f, and the target object information generating module 40f have the same configurations as those of the underwater detection apparatus 1f according to the modification illustrated in FIG. 18, description thereof is omitted.

The processing target signal extracting module 20h includes a representative signal generating module 29, a representative beat signal generating module 32, the selected number determining module 33, a plurality of candidate data generating modules 19 and data selecting modules 26a (in this modification, M modules, respectively). Since the representative signal generating module 29 has the same configuration as the representative signal generating module 29 illustrated in FIG. 19, description thereof is omitted.

The representative beat signal generating module 32 includes a third multiplying module 15a, a fourth multiplying module 16a, and an adding module 17a.

The third multiplying module 15a is inputted with a representative signal generated by the representative signal generating module 29 and a high-frequency local signal LOH generated by a high-frequency local signal generating module 13. The third multiplying module 15a mixes these signals. The third multiplying module 15a extracts a signal having a difference between the frequency of the high-frequency local signal LOH and the frequency of the representative signal as a frequency component from the mixing result, and outputs the extracted signal to the adding module 17a.

The fourth multiplying module 16a is inputted with the representative signal generated by the representative signal generating module 29 and the low-frequency local signal LOL generated by the low-frequency local signal generating module 14. The fourth multiplying module 16a mixes these signals. The fourth multiplying module 16a extracts a signal having a difference between the frequency of the low-frequency local signal LOL and the frequency of the representative signal as a frequency component from the mixing result, and outputs the extracted signal to the adding module 17a.

The adding module 17a adds the signal outputted from the third multiplying module 15a to the signal outputted from the fourth multiplying module 16a. The adding module 17a outputs the added result to the selected number determining module 33 as a representative beat signal BS_R.

As illustrated in FIG. 23, the selected number determining module 33 includes a plurality of, representative beat signal extracting modules 21d, 21e and 21f (in this modification, three modules), window function multiplying modules 22d, 22e and 22f, and frequency analyzing modules 23d, 23e and 23f, an absolute value calculating module 24a, and a minimum value selecting module 25a.

Specifically, the three representative beat signal extracting modules are a front representative beat signal extracting module 21d, a basic representative beat signal extracting module 21e, and a rear representative beat signal extracting module 21f. Operations of these extracting modules are the same as the three beat signal extracting modules 21a, 21b and 21c in the above embodiment, except that the signals with which the representative beat signal extracting modules 21d, 21e and 21f deal are representative beat signals and, thus, description thereof is omitted. Note that the representative beat signal extracting modules 21d, 21e and 21f extract extracted representative beat signals from the representative beat signal BS_R. Moreover, operations of the window function multiplying modules 22d, 22e and 22f and the frequency analyzing modules 23d, 23e and 23f are also the same as the window function multiplying modules 22a, 22b and 22c and the frequency analyzing modules 23a, 23b and 23c of the above embodiment, except that the signals with which these modules deal are signals based on the representative beat signals, description thereof is omitted. The three frequency analyzing modules 23d, 23e and 23f output 3×N complex data (hereinafter, referred to as "the representative signal complex data"), each with an assigned number.

The absolute value calculating module 24a calculates an absolute value of a complex value at each point of the 3×N representative signal complex data outputted from the frequency analyzing modules 23d, 23e, and 23f. That is, the absolute value calculating module 24a calculates 3×N absolute values for each distance sample (i.e., for each depth position).

The minimum value selecting module 25a selects the smallest absolute value among the 3×N absolute values for each distance sample calculated by the absolute value calculating module 24a, and outputs the number assigned to the representative signal complex data from which the smallest absolute value has been calculated to each data selecting module 26a as a selected number of each distance sample.

As illustrated in FIG. 24, each candidate data generating module 19 includes three beat signal extracting modules 21a, 21b and 21c, three window function multiplying modules 22a, 22b and 22c, and three frequency analyzing modules 23a, 23b and 23c. Operations of these modules are the same as the above embodiment, description thereof is omitted. That is, each candidate data generating module 19 outputs the 3×N complex data to which the numbers are assigned. Note that the numbers assigned to the plurality of complex data are determined based on the same rules as the numbers assigned to the plurality of representative signal complex data. For example, numbers determined for each combination of a position of the gate interval (in this modification, the front gate interval, the basic gate interval, and the rear gate interval), and a type of the window function used for multiplication (in this modification, N window functions which are mutually different) are assigned to the 3×N representative signal complex data and the 3×N complex data, respectively.

The data selecting module 26a outputs the complex data with the number corresponding to the selected number outputted from the minimum value selecting module 25a to the target object information generating module 40f as a processing target signal. The data selecting module 26a sequentially outputs the processing target signal selected for each distance sample to the target object information generating module 40f as IQ echo data. That is, the data selecting module 26a selects a signal based on one of the front signal Sa, the basic signal Sb, and the rear signal Sc, for each distance sample. As a result, the processing target signal extracting module 20h extracts the processing target signal asynchronously from the transmitting cycle of the transmission wave.

As described above, the underwater detection apparatus according to this modification determines the complex data based on which gate interval and which window function is applied on the representative signal, and generates the echo image based on the complex data. For example, in this modification, the signals within the front gate interval, the basic gate interval, and the rear gate interval are extracted for the representative beat signal generated based on the representative signal, then the window function application and the frequency analysis are performed on each signal, and then, the calculation of the absolute value and the selection of the minimum value are performed on each signal, and the selected signal for each distance sample is outputted. Similarly, the signals within the front gate interval, the basic gate interval, and the rear gate interval are extracted also for the beat signal BSm acquired from the reception signal of each channel, the window function application and the frequency analysis are performed on each signal, and the calculations of the plurality of complex data are performed. From the plurality of complex data, the complex data having the same number as the selected number acquired based on the representative signal is selected, and the echo image is generated based on this complex data. Thus, since the relative shift of the phase of the complex data among the channels is prevented, beamforming can be appropriately performed by the target object information generating module 40f provided downstream of the process. Since such a technique also reduces the side lobes that appear in connection with the peak waveform of the target objects, similar to the above embodiment, the omission in detection of the target objects is prevented.

Figure 25:
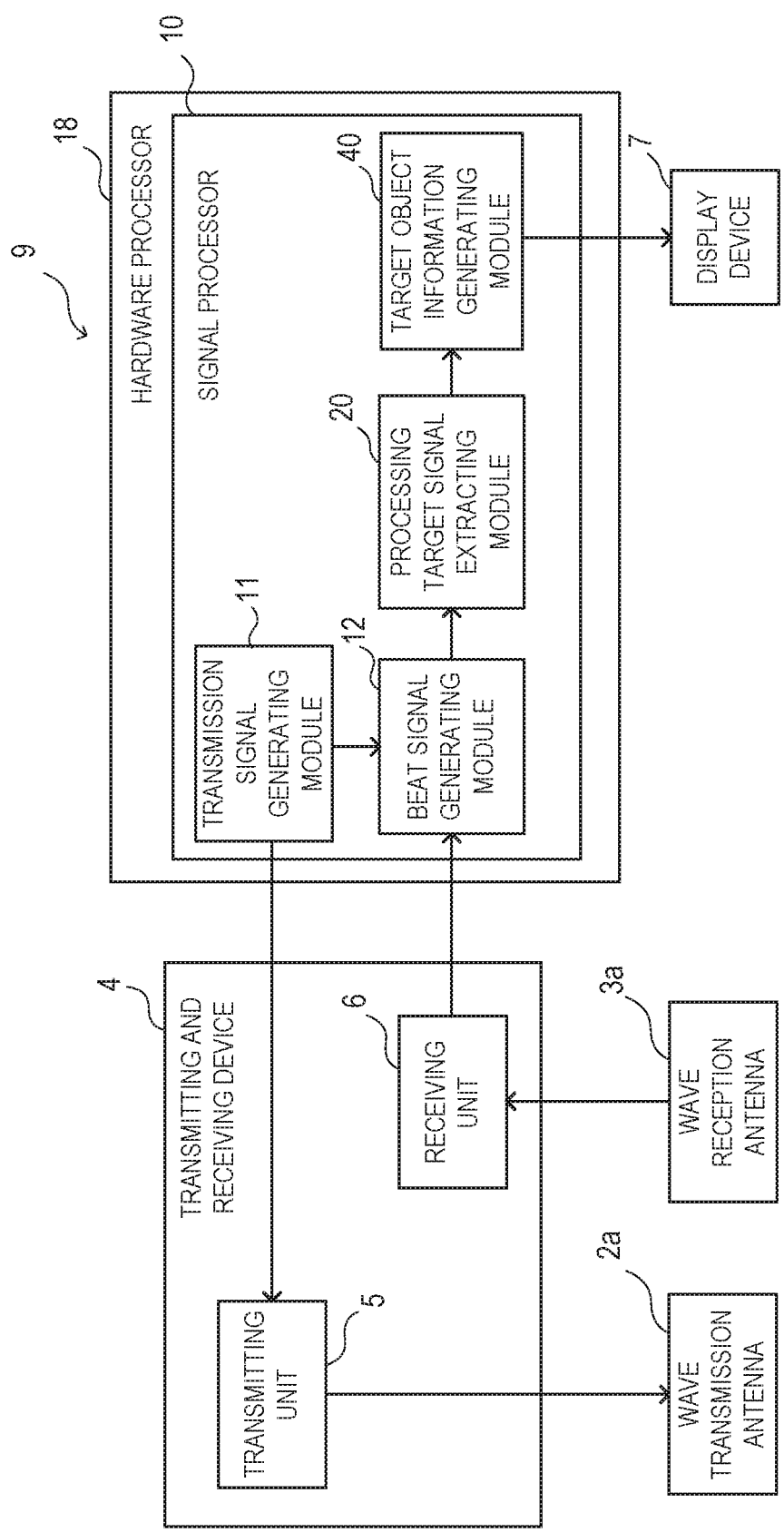
FIG. 25 is a block diagram illustrating a configuration of a radar apparatus according to one embodiment of the present disclosure.

(12) FIG. 25 is a block diagram of a radar apparatus 9 according to one embodiment of the present disclosure. Although the above embodiment and modifications describe examples in which the present disclosure is applied to an underwater detection apparatus, the present disclosure is also applicable to a radar apparatus, as illustrated in FIG. 25. Thus, the radar apparatus which prevents the omission in detection of target objects is provided. Note that, since a configuration and operation of the radar apparatus 9 are substantially the same as the underwater detection apparatuses according to the above embodiment and modifications, except that a wave transmission antenna 2a which transmits electromagnetic waves as the wave transmitter and a wave reception antenna 3a which receives electromagnetic waves as the wave receiver are additionally provided, and the electromagnetic waves are handled as the transmission wave and the reception wave, description thereof is omitted.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein are preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A Continuous Transmission Frequency Modulated (CTFM) detection apparatus, comprising:
   a projector configured to transmit a frequency modulated transmission wave at a given transmission period;
   a sensor configured to receive a reflected wave, the reflected wave comprising a reflection of the transmission wave on a target object; and
   a hardware processor programmed to at least:
      generate a beat signal based at least in part on the transmission wave and the reflected wave,
      extract a plurality of extracted beat signals from the beat signal, each extracted beat signal from the plurality of extracted beat signals being extracted by applying a different gate interval of a plurality of gate intervals to the beat signal, wherein the gate interval for at least some of the extracted beat signals are set at different timings,
      extract a processing signal from the beat signal, wherein the processing signal is selected from the plurality of extracted beat signals, and
      generate information related to the target object based on the processing signal.

2. The CTFM detection apparatus of claim 1, wherein the hardware processor is further programmed to at least:
   calculate an absolute value of a complex spectrum corresponding to each extracted beat signal, each complex spectrum being obtained from a frequency conversion of the extracted beat signal, and
   select the processing signal from the plurality of extracted beat signals, the selected extracted beat signal corresponding to the complex spectrum with the smallest absolute value.

3. The CTFM detection apparatus of claim 1, wherein the sensor includes a plurality of receiving elements; and
   the hardware processor is further programmed to at least:
      generate a plurality of beat signals, wherein the plurality of beat signals includes the beat signal, and wherein each beat signal corresponds to a receiving element from the plurality of receiving elements, based at least in part on the transmission wave and the reflected wave received by the receiving element,
      generate a representative beat signal based at least in part on the transmission wave and a representative signal, the representative signal being generated from at least one of the reflected waves received by the plurality of receiving elements,
      extract a plurality of extracted representative beat signals from the representative beat signal, each extracted representative beat signal from the plurality of extracted representative beat signals being extracted applying a gate interval to the representative beat signal,
      calculate an absolute value of a complex spectrum corresponding to each extracted representative beat signal, each complex spectrum being obtained from a frequency conversion of the extracted representative beat signal, and
      select the processing signal from the plurality of extracted beat signals, the selected extracted beat signal corresponding to the complex spectrum with the smallest absolute value.

4. The CTFM detection apparatus of claim, 1 wherein at least two gate intervals from the plurality of gate intervals overlap a portion of each other in the time domain.

5. A Continuous Transmission Frequency Modulated (CTFM) detection apparatus, comprising:
   a projector configured to transmit a frequency modulated transmission wave at a given transmission period;
   a sensor configured to receive a reflected wave, the reflected wave comprising a reflection of the transmission wave on a target object; and
   a hardware processor programmed to at least:
      generate a beat signal based at least in part on the transmission wave and the reflected wave,
      detect a beat signal phase jump timing at which a phase change of the beat signal is above a given value,
      apply a gate interval to the beat signal to extract an extracted beat signal, a center time of the gate interval being shifted from the beat signal phase jump timing,
      generate a processing signal based on the extracted beat signal, and
      generate information related to the target object based on the processing signal.

6. The CTFM detection apparatus of claim 5, wherein the hardware processor is further programmed to at least:
   detect the beat signal phase jump timing by calculating phase change of the beat signal.

7. The CTFM detection apparatus of claim 5, wherein the hardware processor is further programmed to at least:
   detect the beat signal phase jump timing by calculating frequency change of a signal generated from the reflected wave.

8. The CTFM detection apparatus of claim 5, wherein the hardware processor is further programmed to at least:
   detect the beat signal phase jump timing based on a position of a given target object relative to the CTFM detection apparatus.

9. The CTFM detection apparatus of claim 5, wherein
   the sensor includes a plurality of receiving elements configured to receive a plurality of reflected waves including the reflected wave; and
   the hardware processor is further programmed to at least:
      generate a plurality of beat signals, wherein the plurality of beat signals includes the beat signal, and wherein each beat signal corresponds to a receiving element from the plurality of receiving elements and is based at least in part on the transmission wave and the reflected wave received by the receiving element,
      detect the beat signal phase jump timing from a representative signal generated from at least one of the plurality of reflected waves received by the plurality of receiving elements, and
      extract the extracted beat signal by applying the gate interval to each of the beat signals and generate the processing signal corresponding to each extracted beat signal.

10. The CTFM detection apparatus of claim 9, wherein the hardware processor is further programmed to at least:
   estimate a direction of the target object using beamforming processing.

11. The CTFM detection apparatus of claim 1, wherein the hardware processor is further programmed to at least:
   multiply, for each extracted beat signal from the plurality of extracted beat signals, the extracted beat signal by a window function, and
   generate the processing signal based on the extracted beat signal multiplied by the window function.

12. The CTFM detection apparatus of claim 5, wherein the hardware processor is further programmed to at least:
   multiply the extracted beat signal by a window function, and generate the processing signal based on the extracted beat signal multiplied by the window function.

13. An underwater detection apparatus comprising the CTFM detection apparatus of claim 1.

14. A radar apparatus comprising the CTFM detection apparatus of claim 1.

15. An underwater detection apparatus comprising the CTFM detection apparatus of claim 5.

16. A radar apparatus comprising the CTFM detection apparatus of claim 5.

* * * * *